(12) United States Patent
Liu et al.

(10) Patent No.: US 11,006,375 B2
(45) Date of Patent: May 11, 2021

(54) POWER ALLOCATION METHOD, POWER ADJUSTMENT METHOD, TERMINAL, AND ACCESS NETWORK DEVICE

(71) Applicant: Huawei Technologies Co., Ltd., Guangdong (CN)

(72) Inventors: Jianqin Liu, Beijing (CN); Bingyu Qu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 44 days.

(21) Appl. No.: 16/400,890

(22) Filed: May 1, 2019

(65) Prior Publication Data

US 2019/0261291 A1 Aug. 22, 2019

Related U.S. Application Data

(63) Continuation of application No. PCT/CN2017/109238, filed on Nov. 3, 2017.

(30) Foreign Application Priority Data

Nov. 3, 2016 (CN) .......................... 201610956516.2

(51) Int. Cl.
*H04W 52/36* (2009.01)
*H04L 5/00* (2006.01)
(Continued)

(52) U.S. Cl.
CPC ......... *H04W 52/367* (2013.01); *H04L 5/0051* (2013.01); *H04L 25/0226* (2013.01);
(Continued)

(58) Field of Classification Search
CPC ............. H04W 52/367; H04W 52/146; H04W 52/346; H04W 52/281; H04W 52/54;
(Continued)

(56) References Cited

U.S. PATENT DOCUMENTS 9,900,844 B2 * 2/2018 Papasakellariou .. H04W 52/367
2004/0127227 A1 7/2004 Li
(Continued)

FOREIGN PATENT DOCUMENTS

CN 1399427 A 2/2003
CN 101933377 A 12/2010
(Continued)

OTHER PUBLICATIONS

Interdigital Communications, "UE Support for Multiple Numerologies for NR," 3GPP TSG-RAN WG1 #86bis, R1-1610022, Lisbon, Portugal, Oct. 10-14, 2016, 5 pages.
(Continued)

*Primary Examiner* — Habte Mered
(74) *Attorney, Agent, or Firm* — Slater Matsil, LLP

(57) ABSTRACT

This application relates to a method, includes: determining, by a terminal, a first initial transmit power and a second initial transmit power; receiving minimum guaranteed power information that is of channels carried by the first carrier and that is sent by an access network device; and obtaining an available transmit power for channels that are transmitted in N first subframes and that are carried by the first carrier and an available transmit power of a channel that is transmitted in a second subframe and that is carried by a second carrier.

22 Claims, 9 Drawing Sheets

(51) Int. Cl.
*H04L 25/02* (2006.01)
*H04W 72/04* (2009.01)
*H04W 72/10* (2009.01)
*H04W 74/08* (2009.01)
*H04W 52/14* (2009.01)
*H04W 52/34* (2009.01)
*H04W 52/28* (2009.01)
*H04W 52/54* (2009.01)
*H04W 52/38* (2009.01)

(52) U.S. Cl.
CPC ....... *H04W 52/146* (2013.01); *H04W 52/281* (2013.01); *H04W 52/346* (2013.01); *H04W 72/04* (2013.01); *H04W 72/0413* (2013.01); *H04W 72/0446* (2013.01); *H04W 72/0453* (2013.01); *H04W 72/0473* (2013.01); *H04W 72/10* (2013.01); *H04W 74/0833* (2013.01); *H04W 52/38* (2013.01); *H04W 52/54* (2013.01)

(58) Field of Classification Search
CPC . H04W 52/38; H04W 72/04; H04W 72/0413; H04W 72/0446; H04W 72/0453; H04W 72/0473; H04W 72/10; H04W 72/042; H04W 74/0833; H04L 5/0051; H04L 25/0226
See application file for complete search history.

(56) References Cited

U.S. PATENT DOCUMENTS

| 2009/0197632 | A1 | 8/2009 | Ghosh et al. |
| 2011/0038271 | A1 | 2/2011 | Shin et al. |
| 2014/0329555 | A1* | 11/2014 | Gao ................... H04W 52/367 455/522 |
| 2016/0205632 | A1* | 7/2016 | Yi ..................... H04W 52/146 455/522 |
| 2017/0111891 | A1 | 4/2017 | He et al. |
| 2017/0325176 | A1 | 11/2017 | Hwang et al. |
| 2018/0176871 | A1* | 6/2018 | Li ..................... H04W 52/367 |
| 2018/0295585 | A1 | 10/2018 | Hwang et al. |
| 2019/0159138 | A1* | 5/2019 | Lee ................... H04W 52/146 |
| 2020/0245257 | A1* | 7/2020 | Pelletier ............ H04W 52/365 |

FOREIGN PATENT DOCUMENTS

| CN | 101959234 A | 1/2011 |
| CN | 103781163 A | 5/2014 |
| CN | 104936275 A | 9/2015 |
| CN | 104936297 A | 9/2015 |
| CN | 105393608 A | 3/2016 |
| JP | 2015216440 A | 12/2015 |
| JP | 2017504270 A | 2/2017 |
| WO | 2015111915 A1 | 7/2015 |
| WO | 2016000241 A1 | 1/2016 |
| WO | 2016137816 A2 | 9/2016 |

OTHER PUBLICATIONS

LG Electronics, "Discussion on multi-carrier operation between LTE and NR," 3GPP TSG RAN WG1 Meeting #86bis, R1-1609238, Lisbon, Portugal, Oct. 10-14, 2016, 4 pages.

ZTE, "Discussion on PSD offset with PSCCH and PSSCH," 3GPP TSG-RAN WG1 Meeting #86bis, R1-1609812 Lisbon, Portugal, Oct. 10-14, 2016, 4 pages.

Huawei et al., "Discussion on the remaining issues for sidelink power control," 3GPP TSG RAN WG1 Meeting #86bis R1-1609373, Lisbon, Portugal Oct. 10-14, 2016, 3 pages.

* cited by examiner

POWER ALLOCATION METHOD, POWER ADJUSTMENT METHOD, TERMINAL, AND ACCESS NETWORK DEVICE

CROSS-REFERENCE TO RELATED APPLICATIONS

This application is a continuation of International Application No. PCT/CN2017/109238 filed on Nov. 3, 2017, which claims priority to Chinese Patent Application No. 201610956516.2 filed on Nov. 3, 2016, both of which are hereby incorporated by reference in their entireties.

TECHNICAL FIELD

This application relates to the field of communications technologies, and in particular, to a power allocation method, a power adjustment method, a terminal, and an access network device.

BACKGROUND

A Long Term Evolution Advanced (LTE-A) system is an evolved and enhanced system of a 3rd Generation Partnership Project (3GPP) Long Term Evolution (LTE) system. In the LTE-A system, to meet requirements of the International Telecommunication Union on a peak data rate of a 4th generation communications technology, a carrier aggregation (CA) technology, also referred to as a spectrum aggregation technology or a bandwidth extension technology, is introduced. In carrier aggregation, spectrums of two or more component carriers are aggregated to obtain a larger transmission bandwidth.

In a carrier aggregation scenario, uplink subframes on different carriers overlap with each other. This phenomenon occurs mainly in the following two cases (two carriers are used as an example in all the following descriptions, and a plurality of carriers may be included actually).

Case 1: There is a relatively large difference between a length of an uplink subframe on a first carrier and a length of an uplink subframe on a second carrier, so that one uplink subframe on the second carrier is corresponding to a plurality of uplink subframes on the first carrier. Specifically, in a 5G high-frequency scenario, minimum transmission time granularities (in other words, minimum time units of data transmission) are different on different carriers. For example, a length of a subframe at a high frequency of 28 GHz is 0.3 ms, a length of a subframe at a low frequency of 2 GHz may be set to 1 ms, and therefore one low-frequency subframe is corresponding to a plurality of high-frequency subframes.

Case 2: An uplink subframe on a first carrier and an uplink subframe on a second carrier have approximate lengths or identical lengths. However, start time of the uplink subframe on the first carrier and start time of the uplink subframe on the second carrier are different, and therefore there is a location offset between the uplink subframe on the first carrier and the uplink subframe on the second carrier. Consequently, one uplink subframe on the second carrier overlaps two uplink subframes on the first carrier. Specifically, the two carriers belong to two timing advance groups (TAG), and uplink transmit channels on the two carriers have different timing advances. Consequently, uplink subframes on the two carriers have different start time and overlap with each other.

Before transmitting uplink data in the uplink subframes on the two carriers, a terminal needs to allocate a power to a channel of a corresponding uplink subframe. Usually, in a power allocation method, a channel transmit power required by each uplink subframe (in other words, a transmit power of a channel transmitted in the uplink subframe) is determined based on downlink control information (DCI), and then a transmit power of each channel in an overlapping uplink subframe on the two carriers is determined based on priorities of the channels in the overlapping uplink subframe on the two carriers. Specifically, before power allocation, the terminal may obtain two pieces of DCI corresponding to the two carriers respectively. For the second carrier, information including power allocation information and the like about a to-be-transmitted channel, in an uplink subframe, to which a power needs to be allocated can be determined based on DCI corresponding to the second carrier. For the first carrier, when the DCI corresponding to the second carrier is obtained, only information about channels in first several (or one) uplink subframes, on the first carrier, that overlap the uplink subframe on the second carrier can be obtained, but information about channels in last several (or one) uplink subframes on the first carrier is not included. Consequently, when powers are allocated based on the priorities of the channels in an overlapping uplink subframe on the two carriers, a channel transmit power required by the first carrier in the last several (or one) uplink subframes that overlap on the two carriers cannot be considered.

Because of the foregoing reason, the power allocated according to the foregoing solution may not meet a transmit power requirement of the channels in the last several (or one) uplink subframes on the first carrier.

In addition, in a scenario in which one uplink subframe (a long subframe) on the second carrier overlaps a plurality of uplink subframes (short subframes) on the first carrier, one of the short subframes probably requires a relatively large power, and consequently a power allocation requirement of the entire long subframe cannot be effectively met.

SUMMARY

To resolve a prior-art problem of improper power allocation when an uplink subframe on a first carrier overlaps an uplink subframe on a second carrier, embodiments of the present disclosure provide a power allocation method, a power adjustment method, a terminal, and an access network device. The technical solutions are as follows:

According to a first aspect, an embodiment of the present disclosure provides a power allocation method. The method includes:

determining, by a terminal, a first initial transmit power and a second initial transmit power, where the first initial transmit power includes an initial transmit power of a channel that is transmitted in each of M first subframes and that is carried by a first carrier, and the second initial transmit power is an initial transmit power of a channel that is transmitted in a second subframe and that is carried by a second carrier;

receiving, by the terminal, minimum guaranteed power information that is of channels carried by the first carrier and that is sent by an access network device; and when a sum of any of the first initial transmit powers and the second initial transmit power is greater than a maximum transmit power of the terminal, obtaining, by the terminal, an available transmit power for channels that are transmitted in N first subframes and that are carried by the first carrier and an available transmit power of the channel that is transmitted in the second subframe and that is carried by the second carrier, based on a priority order between the channels that are transmitted in the M first subframes and that are carried by the first carrier and the channel that is transmitted in the second subframe and that is carried by the second carrier and based on the minimum guaranteed power information of the channels carried by the first carrier, where the second subframe on the second carrier overlaps the N first subframes on the first carrier, the M first subframes are first M first subframes of the N first subframes, N is greater than M, and M and N are positive integers.

In this application, when an uplink subframe on one carrier overlaps a plurality of uplink subframes on another carrier, a minimum guaranteed power is reserved for a last part of an overlapping area, so that a power requirement in the last part of the overlapping area can be met during uplink power allocation to the two carriers, to ensure performance of data transmission in an uplink subframe of the last part of the overlapping area. This implements maximization of power efficiency of uplink data transmission and data transmission performance.

In a first possible implementation of the first aspect, the obtaining, by the terminal, an available transmit power for channels that are transmitted in N first subframes and that are carried by the first carrier and an available transmit power of the channel that is transmitted in the second subframe and that is carried by the second carrier, based on a priority order between the channels that are transmitted in the M first subframes and that are carried by the first carrier and the channel that is transmitted in the second subframe and that is carried by the second carrier and based on the minimum guaranteed power information of the channels carried by the first carrier includes:

obtaining, by the terminal, a minimum guaranteed power based on the minimum guaranteed power information of the channels carried by the first carrier;

obtaining, by the terminal, a first available transmit power for the channels that are transmitted in the N first subframes and that are carried by the first carrier and a second available transmit power of the channel that is transmitted in the second subframe and that is carried by the second carrier, based on the priority order between the channels that are transmitted in the M first subframes and that are carried by the first carrier and the channel that is transmitted in the second subframe and that is carried by the second carrier; and determining, by the terminal based on the minimum guaranteed power and at least one of the first available transmit power and the second available transmit power, at least one of the available transmit power for the channels that are transmitted in the N first subframes and that are carried by the first carrier and the available transmit power of the channel that is transmitted in the second subframe and that is carried by the second carrier.

In the implementation, the first available transmit power and the second available transmit power are first determined based on the priority order between the channels that are transmitted in the M first subframes and that are carried by the first carrier and the channel that is transmitted in the second subframe and that is carried by the second carrier, to ensure that a power is preferably allocated to a channel with a higher priority. After the foregoing step is completed, powers are allocated again based on the first available transmit power, the second available transmit power, and the minimum guaranteed power, to ensure a proper power for the channels that are transmitted in the N first subframes and that are carried by the first carrier.

With reference to the first possible implementation, in a second possible implementation of the first aspect, the obtaining, by the terminal, a first available transmit power for the channels that are transmitted in the N first subframes and that are carried by the first carrier and a second available transmit power of the channel that is transmitted in the second subframe and that is carried by the second carrier, based on the priority order between the channels that are transmitted in the M first subframes and that are carried by the first carrier and the channel that is transmitted in the second subframe and that is carried by the second carrier includes:

reducing the first initial transmit power and the second initial transmit power based on the priority order, to respectively obtain the first available transmit power for the channels that are transmitted in the N first subframes and that are carried by the first carrier and the second available transmit power of the channel that is transmitted in the second subframe and that is carried by the second carrier, where a sum of the first available transmit power of the channel that is transmitted in each of the N first subframes and that is carried by the first carrier and the second available transmit power of the channel that is transmitted in the second subframe and that is carried by the second carrier is less than or equal to the maximum transmit power.

In the implementation, the first initial transmit power and the second initial transmit power are reduced based on the priority order, to ensure that a sum of transmit powers that are finally allocated to the channels of the two carriers does not exceed the maximum transmit power of the terminal.

Specifically, an initial transmit power of a channel with a lower priority is reduced until the sum of the first available transmit power for the channels that are transmitted in the N first subframes and that are carried by the first carrier and the second available transmit power of the channel that is transmitted in the second subframe and that is carried by the second carrier is less than or equal to the maximum transmit power.

Alternatively, initial transmit powers of channels with different priorities are reduced according to different reduction ratios (a reduction ratio of a channel with a lower priority is greater than a reduction ratio of a channel with a higher priority) until the sum of the first available transmit power for the channels that are transmitted in the N first subframes and that are carried by the first carrier and the second available transmit power of the channel that is transmitted in the second subframe and that is carried by the second carrier is less than or equal to the maximum transmit power.

With reference to the first aspect or the first or the second possible implementation of the first aspect, in a third possible implementation of the first aspect, the priority order between the channels that are transmitted in the M first subframes and that are carried by the first carrier and the channel that is transmitted in the second subframe and that is carried by the second carrier includes at least one of a priority order between channel types, a priority order between UCI carried by channels, and a priority order between carriers corresponding to channels.

In the implementation, the priority order includes different combination manners, so that the terminal can allocate powers in different priority order manners in different scenarios.

With reference to the third possible implementation, in a fourth possible implementation of the first aspect, the priority order between channel types includes at least one of the following:

when there is a physical random access channel PRACH, the PRACH has a highest priority;

when a physical uplink control channel PUCCH and a physical uplink shared channel PUSCH coexist, a priority of the PUCCH is higher than a priority of the PUSCH, or a priority of the PUCCH is higher than a priority of a PUSCH carrying no UCI and is the same as a priority of a PUSCH carrying UCI;

when a PUSCH carrying uplink control information UCI and a PUSCH carrying no UCI coexist, a priority of the PUSCH carrying UCI is higher than a priority of the PUSCH carrying no UCI; or when a PRACH, a PUCCH, a PUSCH, and a sounding reference signal SRS coexist, the SRS has a lowest priority.

Specifically, the priority order between UCI carried by channels includes at least one of the following:

when channel state information and a scheduling request coexist, a priority of the channel state information is lower than a priority of the scheduling request; or when hybrid automatic repeat request information and a scheduling request coexist, a priority of the hybrid automatic repeat request information is higher than or equal to a priority of the scheduling request.

Specifically, the priority order between carriers corresponding to channels includes at least one of the following:

a priority order determined based on index numbers of carriers, a priority order of carriers that is configured at a higher layer, a priority order determined based on a duplex manner of carriers, a priority order determined based on radio resource control RRC connection states of carriers, and a priority order determined based on transmission points corresponding to carriers.

The priority order determined based on RRC connection states of carriers includes at least one of the following:

a priority of a carrier supporting an RRC connection is higher than a priority of a carrier supporting no RRC connection; and a priority of a carrier carrying RRC information is higher than a priority of a carrier carrying no RRC information.

In the implementation, the priority order between channel types includes different combination manners, so that the terminal can allocate powers in different priority order manners of channel types in different scenarios.

With reference to the first aspect or the first or the second possible implementation of the first aspect, in a fifth possible implementation of the first aspect, the method further includes:

receiving, by the terminal, higher layer signaling or physical layer signaling that is sent by the access network device on the first carrier or the second carrier, where the higher layer signaling or the physical layer signaling includes a priority order rule, and the priority order rule is used to determine the priority order between the channels that are transmitted in the M first subframes and that are carried by the first carrier and the channel that is transmitted in the second subframe and that is carried by the second carrier.

In the implementation, the access network device transmits the priority order rule to the terminal by using the higher layer signaling or the physical layer signaling that is sent on the first carrier or the second carrier, to ensure that the terminal can successfully complete power allocation according to the priority order rule.

The higher layer signaling may be radio resource control signaling, and the physical layer signaling may be downlink control information signaling.

With reference to the first aspect or the first or the second possible implementation of the first aspect, in a sixth possible implementation of the first aspect, the receiving, by the terminal, minimum guaranteed power information that is of channels carried by the first carrier and that is sent by an access network device includes:

receiving, by the terminal, first signaling that is sent by the access network device on the first carrier or the second carrier, where the first signaling is higher layer signaling or physical layer signaling that carries the minimum guaranteed power information of the channels carried by the first carrier.

In the implementation, the access network device transmits the minimum guaranteed power information to the terminal by using signaling that is sent on the first carrier or the second carrier, to ensure that the terminal can successfully complete power allocation based on the minimum guaranteed power information.

With reference to the sixth possible implementation, in a seventh possible implementation of the first aspect, a transmission subframe of the first signaling that is sent on the first carrier overlaps a transmission subframe of the second signaling that is sent on the second carrier, and the second signaling carries power allocation information of the channel that is carried by the second carrier in the second subframe.

In the implementation, the first signaling that is used to transmit the minimum guaranteed power information overlaps the second signaling that carries the power allocation information of the channel that is carried by the second carrier in the second subframe, to ensure that the terminal can obtain the minimum guaranteed power information when power allocation starts.

Optionally, the method may further include: transmitting, by the terminal based on the available transmit power for the channels that are transmitted in the N first subframes and that are carried by the first carrier, the channels that are transmitted in the N first subframes and that are carried by the first carrier, and transmitting, based on the available transmit power of the channel that is transmitted in the second subframe and that is carried by the second carrier, the channel that is transmitted in the second subframe and that is carried by the second carrier.

According to a second aspect, an embodiment of the present disclosure provides a power adjustment method. The method includes:

receiving, by a terminal, a power adjustment factor sent by an access network device; and obtaining, by the terminal, an available transmit power of a channel in a second part of a subframe based on the power adjustment factor and an available transmit power of a channel in a first part of the subframe, where the subframe includes the first part and the second part, the second part follows the first part, the power adjustment factor is used to determine an offset value between the available transmit power of the channel in the first part of the subframe and the available transmit power of the channel in the second part of the subframe.

In this application, during data transmission, transmit powers of channels in two parts of a subframe are adjusted by using the power adjustment factor, so that the transmit powers of the channels in the subframe can be adjusted in real time, and power allocation and power efficiency of the channels in the subframe can be maximized.

The offset value may be a ratio value or a difference value. When the power adjustment factor is the difference value, controlling the offset value to be positive or negative to increase or reduce a first power, to obtain a second power. When the power adjustment factor is the ratio value, controlling the power value to be greater than or less than 1 to increase or reduce a first power, to obtain a second power.

In a first possible implementation of the second aspect, the receiving, by a terminal, a power adjustment factor sent by an access network device includes:

receiving, by the terminal, the power adjustment factor that is sent by the access network device by using higher layer signaling or physical layer signaling.

The higher layer signaling may be RRC signaling, and the physical layer signaling may be DCI signaling.

With reference to the second aspect or the first possible implementation of the second aspect, in a second possible implementation of the second aspect, the power adjustment factor is a cell-specific parameter.

According to a third aspect, an embodiment of the present disclosure provides a power allocation method. The method includes:

determining, by an access network device, minimum guaranteed power information of channels carried by a first carrier; and sending, by the access network device to a terminal, the minimum guaranteed power information of the channels carried by the first carrier, where the minimum guaranteed power information is used by the terminal to obtain, when a sum of any of the first initial transmit powers and a second initial transmit power is greater than a maximum transmit power of the terminal, an available transmit power for channels that are transmitted in N first subframes and that are carried by the first carrier and an available transmit power of a channel that is transmitted in a second subframe and that is carried by a second carrier, based on a priority order between channels that are transmitted in M first subframes and that are carried by the first carrier and the channel that is transmitted in the second subframe and that is carried by the second carrier and based on the minimum guaranteed power information of the channels that is carried by the first carrier, the first initial transmit power includes an initial transmit power of the channel that is transmitted in each of the M first subframes and that is carried by the first carrier, the second initial transmit power is an initial transmit power of the channel that is transmitted in the second subframe and that is carried by the second carrier, the second subframe on the second carrier overlaps the N first subframes on the first carrier, the M first subframes are first M first subframes of the N first subframes, N is greater than M, and M and N are positive integers.

In a first possible implementation of the third aspect, the sending, by the access network device to a terminal, minimum guaranteed power information of the channels carried by the first carrier includes:

sending, by the access network device, higher layer signaling or physical layer signaling to the terminal on the first carrier or the second carrier, where the higher layer signaling or the physical layer signaling includes the minimum guaranteed power information of the channels carried by the first carrier.

With reference to the first possible implementation, in a second possible implementation of the third aspect, a transmission subframe of the first signaling that is sent on the first carrier overlaps a transmission subframe of the second signaling that is sent on the second carrier, and the second signaling carries power allocation information of the channel that is carried by the second carrier in the second subframe.

With reference to the third aspect or the first or the second possible implementation of the third aspect, in a third possible implementation of the third aspect, the method further includes:

sending, by the access network device, the higher layer signaling or the physical layer signaling to the terminal on the first carrier or the second carrier, where the higher layer signaling or the physical layer signaling includes a priority order rule, and the priority order rule is used to determine the priority order between the channels that are transmitted in the M first subframes and that are carried by the first carrier and the channel that is transmitted in the second subframe and that is carried by the second carrier.

With reference to the third possible implementation, in a fourth possible implementation of the third aspect, the priority order between the channels that are transmitted in the M first subframes and that are carried by the first carrier and the channel that is transmitted in the second subframe and that is carried by the second carrier includes at least one of a priority order between channel types, a priority order between UCI carried by channels, and a priority order between carriers corresponding to channels.

With reference to the fourth possible implementation, in a fifth possible implementation of the third aspect, the priority order between channel types includes at least one of the following:

when there is a physical random access channel PRACH, the PRACH has a highest priority;

when a physical uplink control channel PUCCH and a physical uplink shared channel PUSCH coexist, a priority of the PUCCH is higher than a priority of the PUSCH, or a priority of the PUCCH is higher than a priority of a PUSCH carrying no UCI and is the same as a priority of a PUSCH carrying UCI;

when a PUSCH carrying uplink control information UCI and a PUSCH carrying no UCI coexist, a priority of the PUSCH carrying UCI is higher than a priority of the PUSCH carrying no UCI; or when a PRACH, a PUCCH, a PUSCH, and an SRS coexist, the SRS has a lowest priority.

According to a fourth aspect, an embodiment of the present disclosure provides a power adjustment method. The method includes:

determining, by an access network device, a power adjustment factor; and sending, by the access network device, the power adjustment factor to a terminal, where the power adjustment factor is used by the terminal to obtain an available transmit power of a channel in a second part of a subframe based on the power adjustment factor and an available transmit power of a channel in a first part of the subframe, where the subframe includes the first part and the second part, the second part follows the first part, and the power adjustment factor is used to determine an offset value between the available transmit power of the channel in the first part of the subframe and the available transmit power of the channel in the second part of the subframe.

In a first possible implementation of the fourth aspect, the sending, by the access network device, the power adjustment factor to a terminal includes:

sending, by the access network device, the power adjustment factor to the terminal by using higher layer signaling or physical layer signaling.

With reference to the fourth aspect or the first possible implementation of the fourth aspect, in a second possible implementation of the fourth aspect, the power adjustment factor is a cell-specific parameter.

According to a fifth aspect, an embodiment of the present disclosure provides a communications apparatus. The apparatus includes units, such as a determining unit, a receiving unit, and a processing unit, configured to implement the method described in the first aspect.

According to a sixth aspect, an embodiment of the present disclosure provides a communications apparatus. The apparatus includes units, such as a receiving unit and a processing unit, configured to implement the method described in the second aspect.

According to a seventh aspect, an embodiment of the present disclosure provides a communications apparatus. The apparatus includes units, such as a determining unit and a sending unit, configured to implement the method described in the third aspect.

According to an eighth aspect, an embodiment of the present disclosure provides a communications apparatus. The apparatus includes units, such as a determining unit and a sending unit, configured to implement the method described in the fourth aspect.

According to a ninth aspect, an embodiment of the present disclosure provides a communications system. The system includes a terminal and an access network device. The terminal includes the communications apparatus provided in the fifth aspect or the sixth aspect. The access network device includes the communications apparatus provided in the seventh aspect or the eighth aspect.

According to a tenth aspect, an embodiment of the present disclosure provides a terminal. The terminal includes a processor, a memory, and a transceiver. The processor, the memory, and the transceiver are coupled by using a bus. The memory is configured to store a program instruction. The processor executes the program instruction stored in the memory, so that the terminal can perform the method described in the first aspect or the second aspect.

According to an eleventh aspect, an embodiment of the present disclosure further provides a computer readable medium, configured to store program code to be executed by a terminal. The program code includes an instruction used to perform the method described in the first aspect or the second aspect.

According to a twelfth aspect, an embodiment of the present disclosure provides an access network device. The access network device includes a processor, a memory, and a transceiver. The processor, the memory, and the transceiver are coupled by using a bus. The memory is configured to store a program instruction. The processor executes the program instruction stored in the memory, so that the terminal can perform the method described in the third aspect or the fourth aspect.

According to a thirteenth aspect, an embodiment of the present disclosure further provides a computer readable medium, configured to store program code to be executed by a terminal. The program code includes an instruction used to perform the method described in the third aspect or the fourth aspect.

According to a fourteenth aspect, an embodiment of the present disclosure further provides a communications chip, applied to a mobile communications system device. The communications chip includes a processor, a memory, and a communications interface. The processor, the memory, and the communications interface are coupled by using a bus. The memory is configured to store a program instruction. The processor executes the program instruction stored in the memory, so that the communications system device that is loaded with the communications chip can perform the method provided in any one of the possible implementations of the first aspect, the second aspect, the third aspect, or the fourth aspect.

DETAILED DESCRIPTION

To make the objectives, technical solutions, and advantages of this application clearer, the following further describes the implementations of this application in detail with reference to the accompanying drawings.

Figure 1:
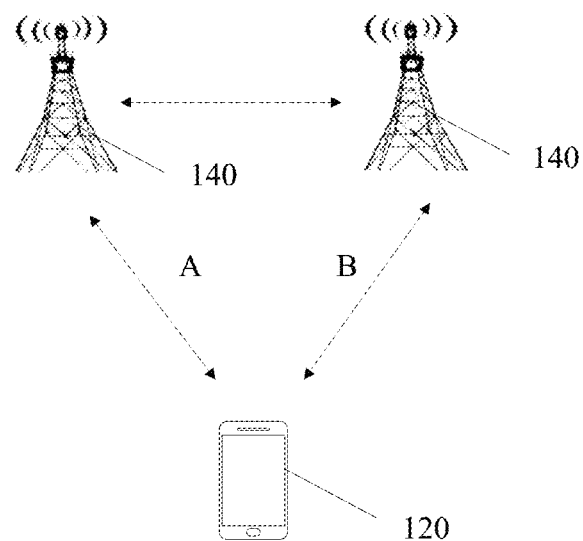
FIG. 1 is an architectural schematic diagram of a communications system according to an embodiment of the present disclosure.
Figure 2:
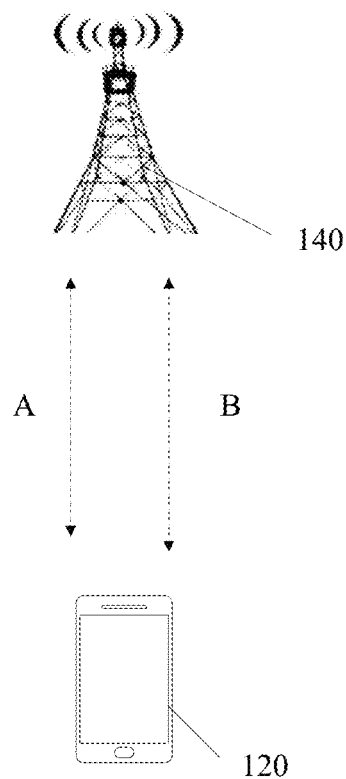
FIG. 2 is an architectural schematic diagram of another communications system according to an embodiment of the present disclosure.

FIG. 1 and FIG. 2 are schematic structural diagrams of communications systems according to the embodiments of the present disclosure. The communications system may be an LTE system or a 5G system. The communications system includes at least one terminal 120 and at least one base station 140.

The communications systems shown in FIG. 1 and FIG. 2 are corresponding to two different application scenarios. To facilitate understanding of the technical solutions provided in the embodiments of the present disclosure, the application scenarios of this application are first described with reference to FIG. 1 and FIG. 2.

Application scenario 1 (referring to FIG. 1) is a scenario of carrier aggregation between access network devices (for example, base stations).

The terminal 120 simultaneously transmits data with two access network devices 140, to implement carrier aggregation. As shown in FIG. 1, the terminal 120 transmits uplink data to one access network device 140 on a carrier A, and the terminal 120 transmits uplink data to another access network device 140 on a carrier B. In this scenario, there are two cases: data can be exchanged in real time (ideal backhaul) and data cannot be exchanged in real time (non-ideal backhaul) between the two access network devices 140. Uplink data and the downlink data are respectively transmitted by using an uplink subframe and a downlink subframe of the carrier A (or the carrier B) as carrying bodies.

If the carrier A and the carrier B belong to two different TAGs, because different TAGs have different timing advances, subframes in which the terminal 120 sends uplink data to the two access network devices 140 have different start time. Therefore, regardless of whether the two subframes have a relatively large or small length difference, there is non-aligned and/or overlapping time between uplink subframes corresponding to the two access network devices. Alternatively, one uplink subframe corresponding to one access network device overlaps at least two uplink subframes corresponding to the other access network device.

If the carrier A and the carrier B belong to two same TAGs, because same TAGs have a same timing advance, uplink subframes in which the terminal 120 sends uplink data to the two access network devices 140 have same start time. Therefore, there is non-aligned and/or overlapping time between two uplink subframes only when there is a relatively large length difference between the two subframes. Alternatively, one uplink subframe corresponding to one access network device overlaps at least two uplink subframes corresponding to the other access network device.

Application scenario 2 (referring to FIG. 2) is carrier aggregation of a single access network device.

The terminal 120 transmits data on at least two carriers to implement carrier aggregation. As shown in FIG. 2, the terminal 120 simultaneously transmits uplink data to the access network device 140 on a carrier A and a carrier B.

If the carrier A and the carrier B belong to two different TAGs, because different TAGs have different timing advances, uplink subframes in which the terminal 120 sends uplink data to the access network device 140 have different start time. Therefore, regardless of whether the two subframes have a relatively large or small length difference, there is non-aligned or overlapping time between uplink subframes corresponding to two access network devices. Alternatively, one uplink subframe corresponding to one access network device overlaps at least two uplink subframes corresponding to the other access network device.

If the carrier A and the carrier B belong to two same TAGs, because same TAGs have a same timing advance, uplink subframes in which the terminal 120 sends uplink data to the access network device 140 have same start time. Therefore, there is non-aligned and/or overlapping time between two uplink subframes corresponding to two access network devices only when there is a relatively large length difference between the two subframes. Alternatively, one uplink subframe corresponding to one access network device overlaps at least two uplink subframes corresponding to the other access network device.

Figure 3:
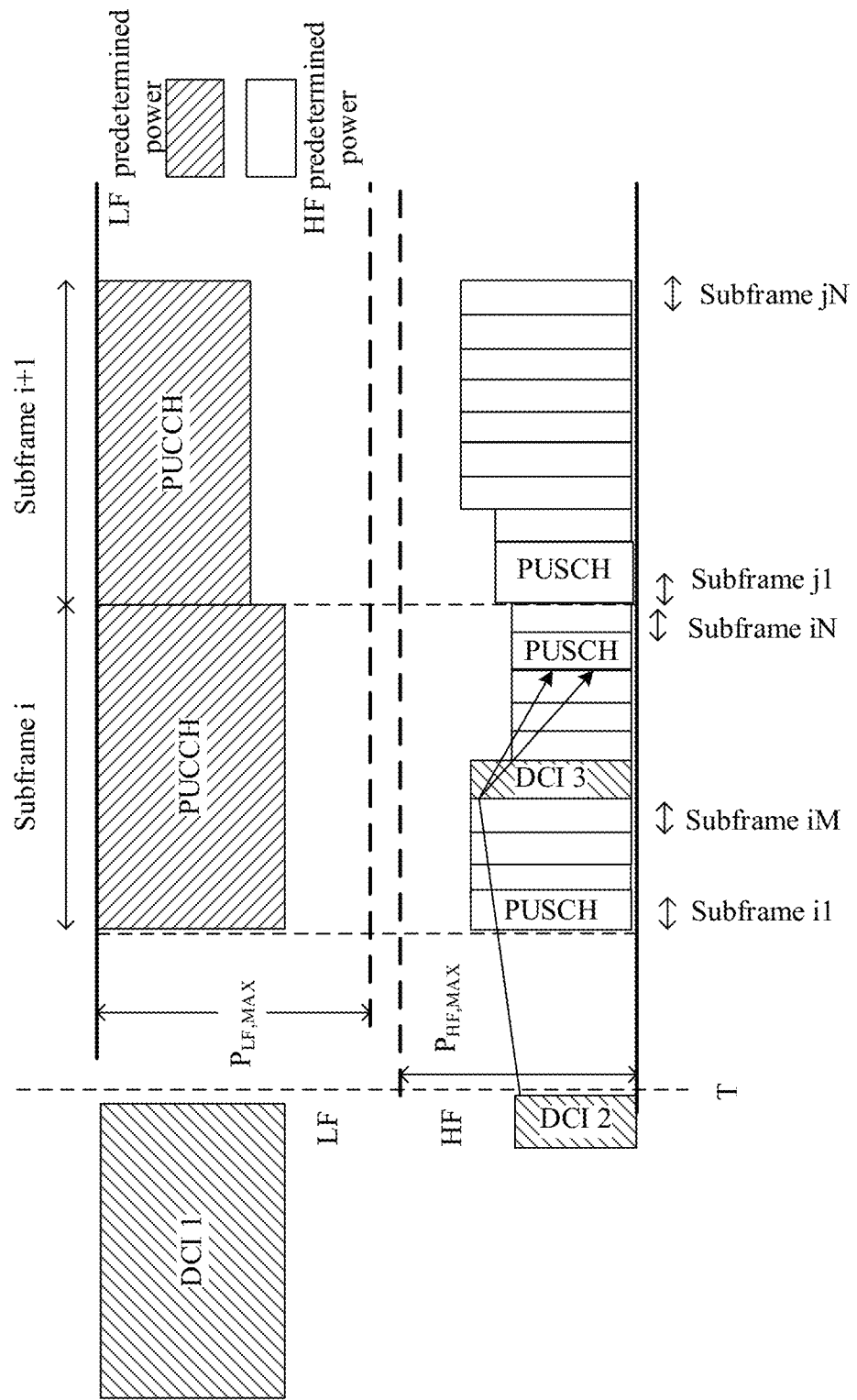
FIG. 3 is a diagram of a time sequence of channels according to an embodiment of the present disclosure.

The following describes a case in which there is a relatively large length difference between two subframes with reference to FIG. 3. As shown in FIG. 3, a terminal implements carrier aggregation transmission with an access network device on a low-frequency carrier and a high-frequency carrier. A length of a subframe on the low-frequency carrier is greater than a length of a subframe on the high-frequency carrier. The subframe on the low-frequency carrier is a long subframe, and the subframe on the high-frequency carrier is a short subframe. One long subframe on the low-frequency carrier overlaps a plurality of short subframes on the high-frequency carrier.

When allocating transmit powers to a long subframe i and a plurality of short subframes overlapping the long subframe i, the terminal needs to know a channel transmit power required by these short subframes, and a channel transmit power required by each of the short subframes is usually determined by using information (for example, a scheduling decision and a power control command) carried in DCI. As shown in FIG. 3, the terminal allocates, at a moment t, transmit powers to a long subframe i and short subframes (i1 to iN) overlapping the long subframe i, and in this case, DCI received by the terminal includes DCI 1 and DCI 2. The DCI 1 carries information that is used to determine a channel transmit power of the long subframe i, the DCI 2 carries only information that is used to determine a channel transmit power for first M short subframes of the N short subframes that overlap the long subframe i, and information that is used to determine a channel transmit power for last (N−M) short subframes is carried in DCI 3. Therefore, a power requirement of the last (N−M) short subframes cannot be met when powers are allocated at the moment t in a conventional manner.

In addition, in some scenarios, if powers are allocated only in the existing manner, a transmit power of a long subframe is also affected.

For example, in dynamic time division duplex (TDD), among a plurality of short subframes that overlap a long subframe, first two short subframes may be uplink subframes that require a relatively large channel transmit power, but last several short subframes are downlink subframes that require a relatively small channel transmit power. If a priority of a channel of a short subframe is higher than a priority of a channel of a long subframe, according to the existing power allocation method, a power is preferably allocated to a short subframe in an overlapping area when the power is limited. Consequently a channel transmit power allocable to uplink data in the long subframe may not meet a required channel transmit power, while in most cases a channel transmit power allocated to uplink data transmission in the short subframe exceeds a channel transmit power actually required by the short subframe. This causes a waste of a transmit power of uplink data transmission in the short subframe and an insufficient power is allocated to uplink data transmission in the long subframe.

All the embodiments of this application are applicable to both application scenario 1 and application scenario 2.

The following describes a terminal and an access network device provided in the embodiments of the present disclosure with reference to specific hardware structures.

Figure 4:
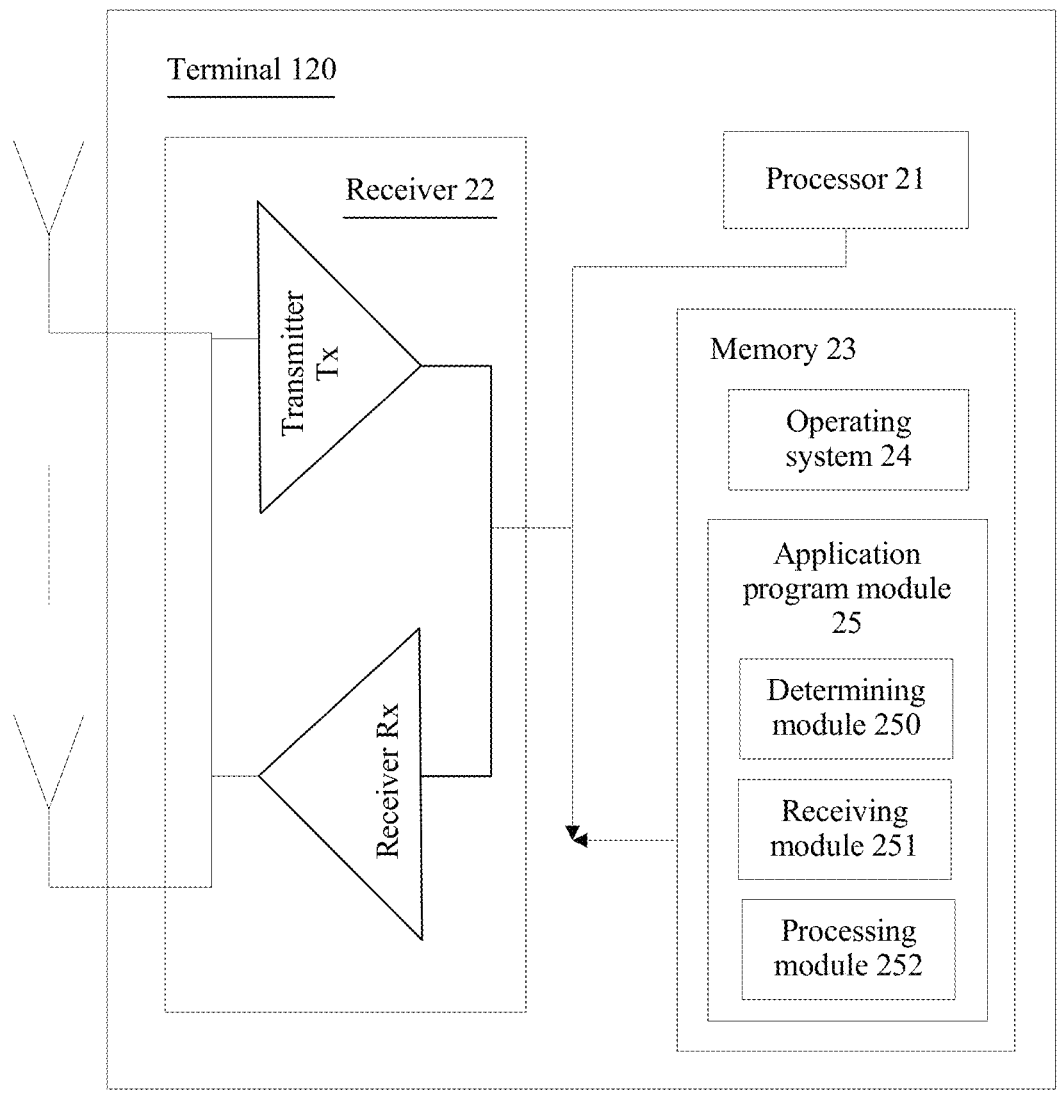
FIG. 4 is a schematic diagram a hardware structure of a terminal according to an embodiment of the present disclosure.

FIG. 4 shows a hardware structure implementing a terminal 120 according to an embodiment of the present disclosure. As shown in FIG. 4, the terminal 120 includes a processor 21, a transceiver 22, and a memory 23.

The processor 21 includes one or more processing cores, and the processor 21 executes various function applications and information processing by running a software program and a module.

The transceiver 22 includes a receiver Rx and a transmitter Tx. The transceiver 22 may be alternatively implemented as a communications chip. The communications chip may include a receiving module, a transmission module, a modem module, and the like, and is configured to modulate/demodulate information and receive/send the information by using a radio signal.

The transceiver 22, the memory 23, and the processor 21 are coupled by using a bus. The memory 23 may be configured to store a software program and a module. The memory may store an operating system 24 and an application program module 25 required by at least one function.

The application program module 25 includes at least a determining module 250 configured to determine information, a receiving module 251 configured to receive information, and a processing module 252 configured to process information. The determining module 250 is configured to determine a first initial transmit power and a second initial transmit power. The first initial transmit power includes an initial transmit power of a channel that is transmitted in each of M first subframes and that is carried by a first carrier. The second initial transmit power is an initial transmit power of a channel that is transmitted in a second subframe and that is carried by a second carrier. The receiving module 251 is configured to receive minimum guaranteed power information that is of channels carried by the first carrier and that is sent by an access network device. The processing module 252 is configured to: when a sum of any of the first initial transmit powers and the second initial transmit power is greater than a maximum transmit power of the terminal, obtain an available transmit power for channels that are transmitted in N first subframes and that are carried by the first carrier and an available transmit power of the channel that is transmitted in the second subframe and that is carried by the second carrier, based on a priority order between the channels that are transmitted in the M first subframes and that are carried by the first carrier and the channel that is transmitted in the second subframe and that is carried by the second carrier and based on the minimum guaranteed power information of the channels carried by the first carrier. The second subframe on the second carrier overlaps the N first subframes on the first carrier, the M first subframes are first M first subframes of the N first subframes, N is greater than M, and M and N are positive integers.

Figure 6:
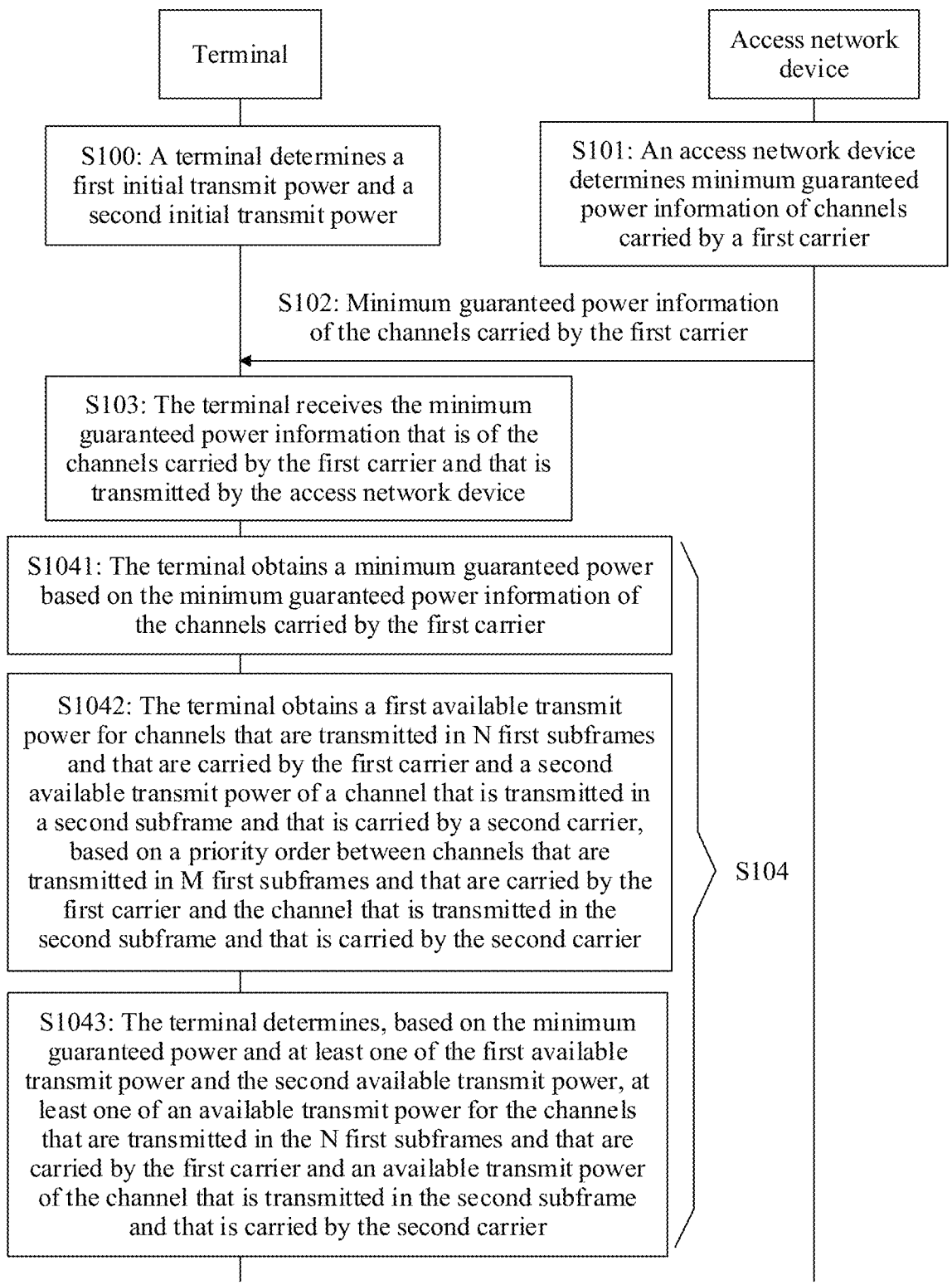
FIG. 6 is a flowchart of a power allocation method according to an embodiment of the present disclosure.

Optionally, the processor 21 is configured to execute modules in the application program module 25, to implement steps in FIG. 6 that need to be performed by the terminal.

Alternatively, the receiving module 251 is configured to receive a power adjustment factor sent by an access network device. The processing module 252 is configured to obtain an available transmit power of a channel in a second part of a subframe based on the power adjustment factor and an available transmit power of a channel in a first part of the subframe. The subframe includes the first part and the second part, and the second part follows the first part. The power adjustment factor is used to determine an offset value between the available transmit power of the channel in the first part of the subframe and the available transmit power of the channel in the second part of the subframe.

Figure 7:
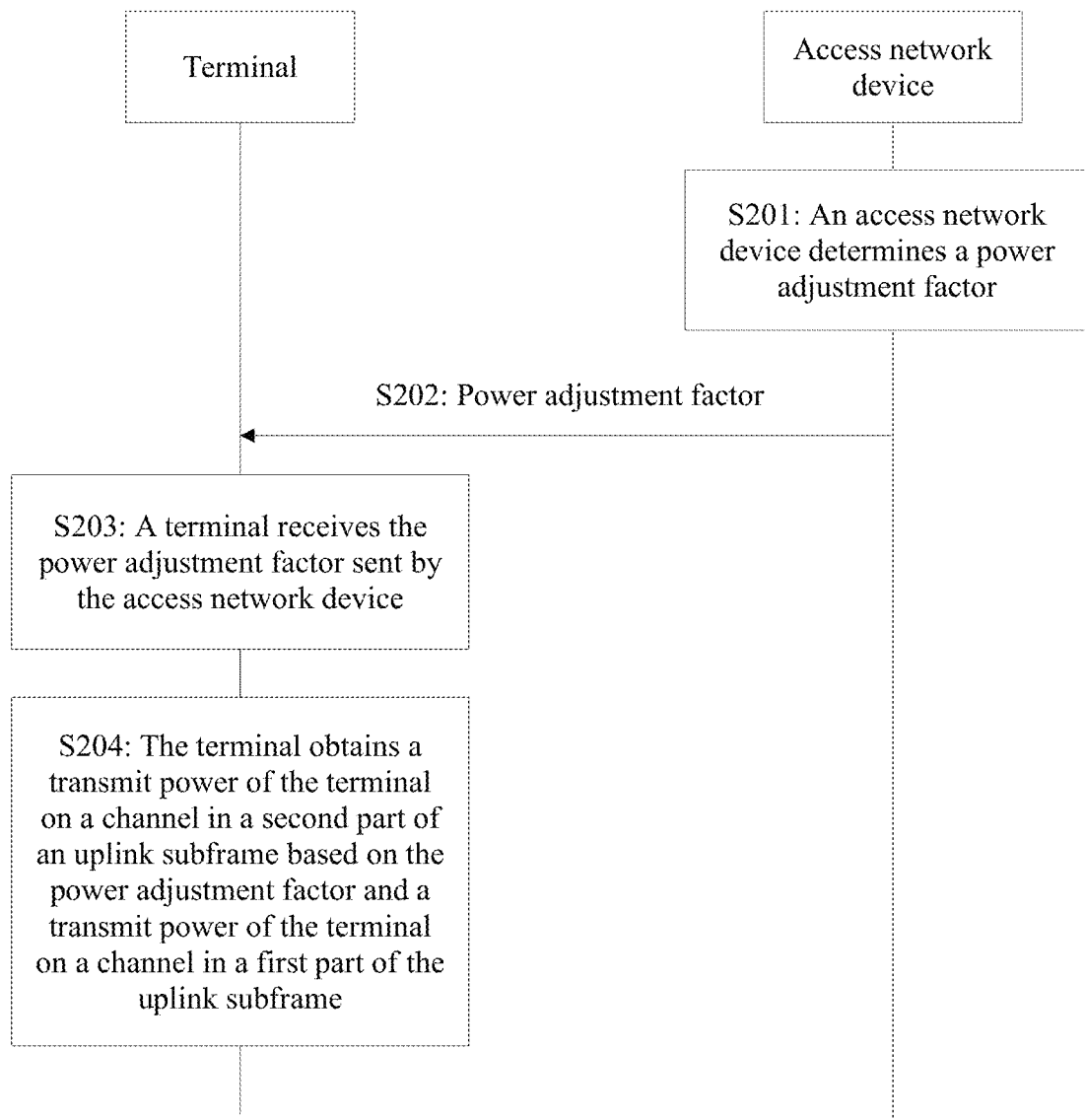
FIG. 7 is a flowchart of a power adjustment method according to an embodiment of the present disclosure.

Correspondingly, the processor 21 is configured to execute modules in the application program module 25, to implement steps in FIG. 7 that need to be performed by the terminal.

In addition, the memory 23 is a computer readable storage medium, and may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

A person skilled in the art may understand that a structure of the terminal 120 shown in FIG. 4 does not constitute any limitation on the terminal, and the terminal may include components more or fewer than those shown in the figure, a combination of some components, or components disposed differently.

Figure 5:
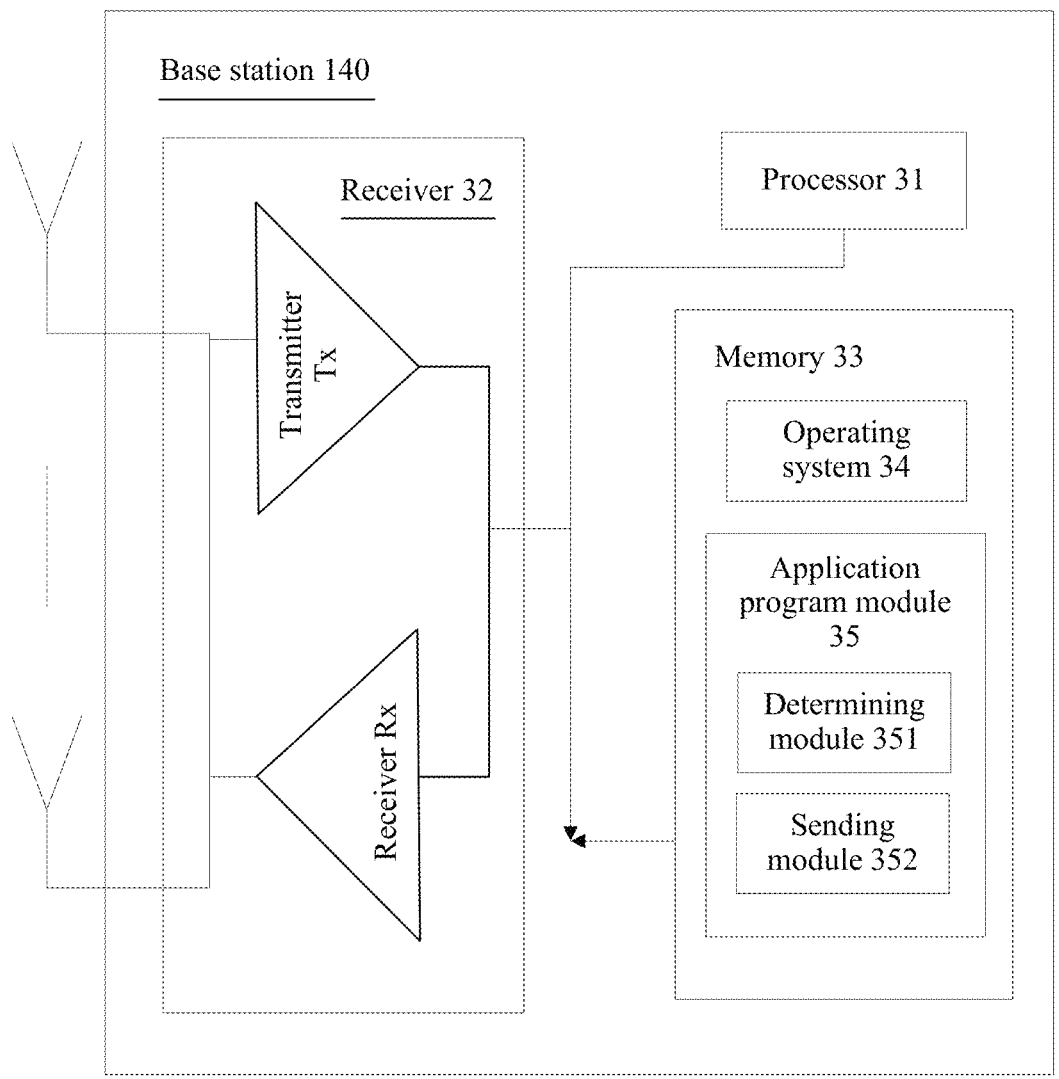
FIG. 5 is a schematic diagram a hardware structure of an access network device according to an embodiment of the present disclosure.

FIG. 5 shows a hardware structure implementing an access network device 140 according to an embodiment of the present disclosure. Referring to FIG. 5, the access network device 140 includes a processor 31, a transceiver 32, and a memory 33.

The processor 31 includes one or more processing cores, and the processor 31 executes various function applications and information processing by running a software program and a module.

The transceiver 32 includes a receiver Rx and a transmitter Tx. The transceiver 32 may be alternatively implemented as a communications chip. The communications chip may include a receiving module, a transmission module, a modem module, and the like, and is configured to modulate/demodulate information and receive/send the information by using a radio signal.

The transceiver 32, the memory 33, and the processor 31 are coupled by using a bus. The memory 33 may be configured to store a software program and a module. The memory may store an operating system 34 and an application program module 35 required by at least one function. The application program module 35 includes at least a determining module 351 configured to determine information and a sending module 352 configured to send information. The determining module 351 is configured to determine minimum guaranteed power information of channels carried by a first carrier. The sending module 352 is configured to send, to a terminal, the minimum guaranteed power information of the channels carried by the first carrier. The minimum guaranteed power information is used to by the terminal to obtain, when a sum of any of the first initial transmit powers and a second initial transmit power is greater than a maximum transmit power of the terminal, an available transmit power for channels that are transmitted in N first subframes and that are carried by the first carrier and an available transmit power of a channel that is transmitted in a second subframe and that is carried by a second carrier, based on a priority order between channels that are transmitted in M first subframes and that are carried by the first carrier and the channel that is transmitted in the second subframe and that is carried by the second carrier and based on the minimum guaranteed power information of the channels carried by the first carrier. The first initial transmit power includes an initial transmit power of the channel that is transmitted in each of the M first subframes and that is carried by the first carrier. The second initial transmit power is an initial transmit power of the channel that is transmitted in the second subframe and that is carried by the second carrier. The second subframe on the second carrier overlaps the N first subframes on the first carrier. The M first subframes are first M first subframes of the N first subframes, N is greater than M, and M and N are positive integers.

Optionally, the processor 31 is configured to execute modules in the application program module 35, to implement steps in FIG. 6 that need to be performed by the access network device.

Alternatively, the determining module 351 is configured to determine a power adjustment factor. The sending module 352 is configured to send the power adjustment factor to a terminal. The power adjustment factor is used by the terminal to obtain an available transmit power of a channel in a second part of a subframe based on the power adjustment factor and an available transmit power of a channel in a first part of the subframe. The subframe includes the first part and the second part, and the second part follows the first part. The power adjustment factor is used to determine an offset value between the available transmit power of the channel in the first part of the subframe and the available transmit power of the channel in the second part of the subframe.

Correspondingly, the processor 31 is configured to execute modules in the application program module 35, to implement steps in FIG. 7 that need to be performed by the access network device.

In addition, the memory 33 is a computer readable storage medium, and may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

A person skilled in the art may understand that a structure of the access network device 140 shown in FIG. 5 does not constitute any limitation on the access network device, and the access network device may include components more or fewer than those shown in the figure, a combination of some components, or components disposed differently.

FIG. 6 shows a power allocation method according to an embodiment of the present disclosure. The method is implemented by using the system shown in FIG. 1 or FIG. 2. The method includes the following steps.

S100: A terminal determines a first initial transmit power and a second initial transmit power, where the first initial transmit power includes an initial transmit power of a channel that is transmitted in each of M first subframes and that is carried by a first carrier, and the second initial transmit power is an initial transmit power of a channel that is transmitted in a second subframe and that is carried by a second carrier.

Before power allocation, the terminal receives DCI (for example, the DCI 1 and the DCI 2 in FIG. 3). The DCI 1 carries information that is used to determine a channel transmit power of a long subframe i, and the DCI 2 carries only information that is used to determine a channel transmit power for first M short subframes of N short subframes that overlap the long subframe i. The terminal determines the first initial transmit power and the second initial transmit power based on the DCI.

S101: An access network device determines minimum guaranteed power information of channels carried by the first carrier.

The minimum guaranteed power information of the channels carried by the first carrier may be an index of a ratio of a minimum guaranteed power to a maximum transmit power.

The minimum guaranteed power for the channels carried by the first carrier is greater than or equal to 0, and the ratio of the minimum guaranteed power to the maximum transmit power PCMAX may be in a percentage (in %) form.

For example, the ratio of the minimum guaranteed power for the channels carried by the first carrier to the maximum transmit power may be any one of the following listed candidate values: 0%, 5%, 10%, 15%, 20%, 30%, 37%, 44%, 50%, 56%, 63%, 70%, 80%, 90%, 95%, and 100%. The minimum guaranteed power for the channels carried by the first carrier is determined based on the index in the minimum guaranteed power information. For example, if the index is 6, the corresponding ratio of the minimum guaranteed power to the maximum transmit power is 30%, and the minimum guaranteed power can be obtained through calculation based on the maximum transmit power.

When the minimum guaranteed power for the channels carried by the first carrier is determined, optionally, the access network device may determine the minimum guaranteed power information of the channels carried by the first carrier, based on a type and a priority of to-be-transmitted data in several overlapping uplink short subframes.

The access network device may determine the minimum guaranteed power information of the channels carried by the first carrier, based on the type of the to-be-transmitted data in the several overlapping uplink short subframes. Specifically, when a channel of the to-be-transmitted data in the several overlapping uplink short subframes has a relatively high priority (for example, several data types with a highest priority), the ratio of the minimum guaranteed power for the channels carried by the first carrier and the maximum transmit power may by greater than or equal to a specified value (for example, 50%). For example, when there is a physical random access channel for to-be-transmitted data types in the several overlapping uplink short subframes, and therefore the minimum guaranteed power of the channels carried by the first carrier may be any one of the foregoing candidate values greater than or equal to 50%.

In an implementation, the minimum guaranteed power information of the channels carried by the first carrier in step S101 is used by the terminal, during a validity period, only when a power is allocated to uplink data on the first carrier in the several overlapping uplink subframes. The validity period may be a quantity of times (for example, one or several times) or may be time (for example, a period of time).

In another implementation, the minimum guaranteed power information of the channels carried by the first carrier in step S101 may be used whenever the terminal allocates a power to the first carrier in the several overlapping uplink subframes.

S102: The access network device sends the minimum guaranteed power information of the channels carried by the first carrier to a terminal.

During implementation, S102 may include: sending, by the access network device, higher layer signaling or physical layer signaling to the terminal, where the higher layer signaling or the physical layer signaling includes the minimum guaranteed power information of the channels carried by the first carrier.

The higher layer signaling may be radio resource control (Radio Resource Control, "RRC" for short) signaling, and the physical layer signaling may be DCI signaling.

During implementation, S102 may include: sending, by the access network device on the first carrier or the second carrier, the minimum guaranteed power information of the channels carried by the first carrier.

To be specific, the higher layer signaling or the physical layer signaling may be higher layer signaling or physical layer signaling that is sent on the second carrier, or the higher layer signaling or the physical layer signaling may be higher layer signaling or physical layer signaling that is sent on the first carrier.

Further, the physical layer signaling is physical layer signaling sent on a primary component carrier (for example, the second carrier), or the physical layer signaling is physical layer signaling sent on a secondary component carrier (for example, the first carrier). For example, the DCI signaling is DCI signaling sent on a primary component carrier, or the DCI signaling is DCI signaling sent on a secondary component carrier. The DCI signaling may be DCI signaling (different from DCI signaling used for a downlink grant (DL grant)) that is particularly used to transmit the minimum guaranteed power information.

Optionally, the access network device further sends, to the terminal by using indication signaling, power allocation information of channels that are in N first subframes and that are carried by the first carrier. The indication signaling is higher layer signaling or physical layer signaling that carries power allocation information of a channel that is in each of the N first subframes and that is carried by the first carrier. When the indication signaling is the physical layer signaling, a transmission subframe of first signaling that is sent on the first carrier overlaps a transmission subframe of second signaling that is sent on the second carrier. The second signaling carries the power allocation information of the channel that is carried by the second carrier in the second subframe.

For example, as shown in FIG. 3, the DCI 2 carries the power allocation information of the channel that is carried by the first carrier in the N first subframes. Alternatively, before the DCI 2 and/or the DCI 3, the access network device sends two pieces of DCI to the terminal. The two pieces of DCI are separately used to indicate power allocation information of channels that are carried by the first carrier in M first subframes and power allocation information of channels that are carried by the first carrier in (N−M) first subframes.

S103: The terminal receives the minimum guaranteed power information that is of the channels carried by the first carrier and that is transmitted by the access network device.

During implementation, S103 may include: receiving, by the terminal, first signaling that is sent by the access network device on the first carrier or the second carrier, where the first signaling is higher layer signaling or physical layer signaling that carries the minimum guaranteed power information of the channels carried by the first carrier.

The transmission subframe of the first signaling that is sent on the first carrier overlaps the transmission subframe of the second signaling that is sent on the second carrier, and the second signaling carries the power allocation information of the channel that is carried by the second carrier in the second subframe.

FIG. 3 is used as an example. The second signaling may be the DCI 1, and the first signaling may be the DCI 2. Transmission subframes of the DCI 1 and DCI 2 overlap with each other. In addition, the minimum guaranteed power information, carried in the DCI 2, of the channels carried by the first carrier may be used in subsequent power allocation.

Optionally, the terminal receives the power allocation information of the channels that are in the N first subframes and that are carried by the first carrier, where the power allocation information is sent by the access network device by using the indication signaling.

S104: When a sum of any of the first initial transmit powers and a second initial transmit power is greater than a maximum transmit power of the terminal, the terminal obtains an available transmit power for channels that are transmitted in N first subframes and that are carried by the first carrier and an available transmit power of a channel that is transmitted in a second subframe and that is carried by a second carrier, based on a priority order between channels that are transmitted in M first subframes and that are carried by the first carrier and the channel that is transmitted in the second subframe and that is carried by the second carrier and based on the minimum guaranteed power information of the channels carried by the first carrier.

The second subframe on the second carrier overlaps the N first subframes on the first carrier, the M first subframes are first M first subframes of the N first subframe, N is greater than M, and M and N are positive integers.

Both the first subframe and the second subframe are uplink subframes. The M first subframes have a same length but may transmit different channels.

Further, overlapping time between the second subframe on the second carrier and the N first subframes on the first carrier is greater than or equal to a preset threshold. The overlapping time is a time length of an overlapping part. The threshold may be time or a ratio of the overlapping time to a time length of the N first subframes. For example, the overlapping time is 50% of the time length of the N first subframes.

Figure 6A:
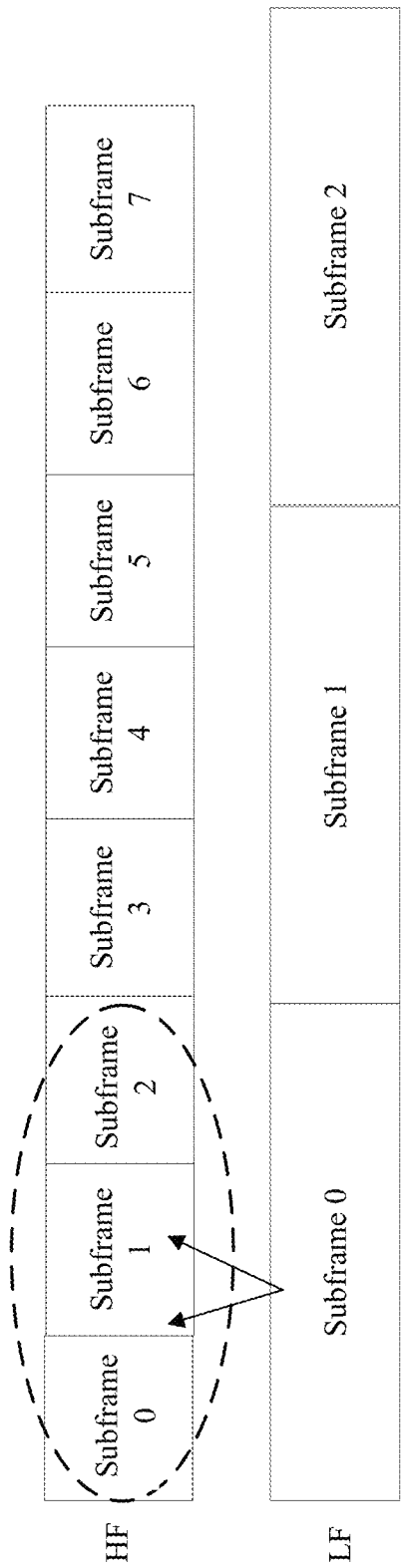
FIG. 6A is a diagram of a time sequence of channels according to an embodiment of the present disclosure.

For example, referring to FIG. 6A, one uplink subframe (the second subframe) on a low-frequency carrier (the second carrier) overlaps three uplink subframes (the first subframe) on a high-frequency carrier (the first carrier, where for example, the low-frequency carrier may be 2 GHz, and the high-frequency carrier is 28 GHz; alternatively, the low-frequency carrier and the high-frequency carrier may be other values, provided that a ratio of an uplink subframe length corresponding to the low-frequency carrier and an uplink subframe length corresponding to the high-frequency carrier is 1/3). During power allocation, the terminal may obtain a transmit power for uplink data transmission in three uplink subframes on the high-frequency carrier and a transmit power for uplink data transmission in one uplink subframe on the low-frequency carrier based on the minimum guaranteed power information of the uplink data transmission on the high-frequency carrier and based on priorities of channels of first two uplink subframes on the high-frequency carrier and a channel of one uplink subframe on the low-frequency carrier that overlaps the channels of the first two uplink subframes on the high-frequency carrier.

During implementation, S104 may include the following steps.

S1041: The terminal obtains a minimum guaranteed power based on the minimum guaranteed power information of the channels carried by the first carrier.

For example, the minimum guaranteed power information in step S101 is an index of the minimum guaranteed power. The terminal stores candidate values for the ratio of the minimum guaranteed power to the maximum transmit power. After obtaining the index of the minimum guaranteed power, the terminal determines, from these candidate values based on the index, the ratio of the minimum guaranteed power to the maximum transmit power, and then can obtain the minimum guaranteed power through calculation based on the ratio and the maximum transmit power.

S1042: The terminal obtains a first available transmit power for the channels that are transmitted in the N first subframes and that are carried by the first carrier and a second available transmit power of the channel that is transmitted in the second subframe and that is carried by the second carrier, based on the priority order between the channels that are transmitted in the M first subframes and that are carried by the first carrier and the channel that is transmitted in the second subframe and that is carried by the second carrier.

In step S1042, to determine the priority order between the channels that are transmitted in the M first subframes and that are carried by the first carrier and the channel that is transmitted in the second subframe and that is carried by the second carrier, the terminal first needs to obtain a priority order rule. The priority order rule is used to determine a priority order of channels of uplink subframes.

In an implementation, the priority order rule may be predefined, and is pre-stored in a terminal, and the terminal can directly obtain the priority order rule when determining a priority.

In another implementation, the priority order rule is sent by the access network device to the terminal. The process may specifically include the following steps.

Step 1: The access network device sends the priority order rule to the terminal.

During implementation, the access network device may send the priority order rule to the terminal by using higher layer signaling or physical layer signaling.

The higher layer signaling may be RRC signaling, and the physical layer signaling may be DCI signaling.

During implementation, the access network device may send the priority order rule to the terminal on the first carrier or the second carrier.

To be specific, the access network device sends the higher layer signaling or the physical layer signaling to the terminal on the first carrier or the second carrier. The higher layer signaling or the physical layer signaling includes the priority order rule. The priority order rule is used to determine the priority order between the channels that are transmitted in the M first subframes and that are carried by the first carrier and the channel that is transmitted in the second subframe and that is carried by the second carrier. In different scenarios, priority order rules are different. The access network device may configure different priority order rules for different users according to different scenarios.

Further, the physical layer signaling is physical layer signaling sent on a primary component carrier (for example, the second carrier), or the physical layer signaling is physical layer signaling sent on a secondary component carrier (for example, the first carrier). For example, the DCI signaling is DCI signaling sent on a primary component carrier, or the DCI signaling is DCI signaling sent on a secondary component carrier.

In this embodiment, a channel priority order includes at least one of the following:

a priority order between channel types, a priority order between uplink control information (UCI) carried by channels, and a priority order between carriers corresponding to channels.

Specifically, the priority order between channel types includes at least one of the following:

when there is a physical random access channel (PRACH), the PRACH has a highest priority;

when a physical uplink control channel (PUCCH) and a physical uplink shared channel (PUSCH) coexist, a priority of the PUCCH is higher than a priority of the PUSCH, or a priority of the PUCCH is higher than a priority of a PUSCH carrying no UCI and is the same as a priority of a PUSCH carrying UCI;

when a PUSCH carrying uplink control information UCI and a PUSCH carrying no UCI coexist, a priority of the PUSCH carrying UCI is higher than a priority of the PUSCH carrying no UCI; or when a PRACH, a PUCCH, a PUSCH, and a sounding reference signal (SRS) coexist, the SRS has a lowest priority.

Specifically, the priority order between UCI carried by channels includes at least one of the following:

when channel state information and a scheduling request coexist, a priority of the channel state information is lower than a priority of the scheduling request; or when hybrid automatic repeat request information and a scheduling request coexist, a priority of the hybrid automatic repeat request information is higher than or equal to a priority of the scheduling request.

Specifically, the priority order between carriers corresponding to channels includes at least one of the following:

a priority order determined based on index numbers of carriers, a priority order of carriers that is configured at a higher layer, a priority order determined based on a duplex manner of carriers, a priority order determined based on radio resource control RRC connection states of carriers, and a priority order determined based on transmission points corresponding to carriers.

The priority order determined based on RRC connection states of carriers includes at least one of the following:

a priority of a carrier supporting an RRC connection is higher than a priority of a carrier supporting no RRC connection; and a priority of a carrier carrying RRC information is higher than a priority of a carrier carrying no RRC information.

Alternatively, the priority order may be correspondingly set according to an actual scenario. For example, in a scenario, a primary component carrier is used to transmit a RACH, and a secondary component carrier is used to transmit an acknowledgment (ACK) instruction (carried on a PUSCH). In this case, the priority order between channel types is: PRACH>PUSCH.

Further, the priority order between channel types may be: PRACH>PUCCH>PUSCH with UCI>PUSCH without UCI>SRS. To be specific, among uplink channels on a plurality of carriers, the random access channel has a highest priority, the uplink control channel has a second highest priority, the uplink shared channel transmitting UCI has a third highest priority, the uplink shared channel transmitting no UCI has a fourth highest priority, and the sounding reference signal has a lowest priority.

In another scenario, the scenario is related to multi-beam sweeping. Specifically, the terminal sends a plurality of random access channels (RACH) by using a plurality of beams in a time division manner. For example, 10 RACHs are used as an example. In a scenario in which uplink subframes on two carriers overlap with each other, if transmit subframes of first six RACHs overlap an $(i-1)^{th}$ long subframe, and transmit subframes of last six RACHs overlap an long subframe, when channel transmit powers are allocated to the $i^{th}$ long subframe and an overlapping short subframe, in the priority order between channel types, a priority of the RACH may be lower than a priority of the PUCCH, that is, PUCCH>PRACH.

In another scenario, a priority order between carriers or cell groups corresponding to channels may be that a priority of any uplink channel on a primary component carrier or in a master cell group is greater than or equal to a priority of any uplink channel on a secondary component carrier or in a secondary cell group.

During implementation, the step may include the following steps:

The access network device determines a corresponding priority order rule based on a type of a data channel that is to be scheduled immediately, and the access network device sends the corresponding priority order rule to the terminal.

Step 2: The terminal receives the priority order rule sent by the access network device.

Specifically, the terminal receives the higher layer signaling or the physical layer signaling that is sent by the access network device on the first carrier or the second carrier. The higher layer signaling or the physical layer signaling includes the priority order rule. The priority order rule is used to determine the priority order between the channels that are transmitted in the M first subframes and that are carried by the first carrier and the channel that is transmitted in the second subframe and that is carried by the second carrier.

Step 3: The terminal determines, according to the priority order rule, the priority order between the channels that are transmitted in the M first subframes and that are carried by the first carrier and the channel that is transmitted in the second subframe and that is carried by the second carrier.

In an implementation, the terminal first selects a first subframe from the M first subframes on the first carrier according to the priority order rule, and then compares a priority of the channel transmitted in the first subframe and a priority of the channel transmitted in the second subframe.

The selecting a first subframe from the M first subframes on the first carrier specifically includes: selecting a first subframe with a highest channel priority from the M first subframes; or selecting a first subframe with a lowest channel priority from the M first subframes; or selecting a first subframe with a specified channel priority (for example, a second highest priority) from the M first subframes.

When channel priorities of two uplink subframes are compared, there are different comparison manners according to different priority order rules.

When the priority order rule includes only one of the foregoing priority orders, for example, includes only the priority order between channel types, if channels of two uplink subframes are of a same type, priorities are the same.

When the priority order rule includes more than two of the foregoing priority orders, for example, includes the priority order between channel types and the priority order between UCI carried by channels, if channels of two uplink subframes are of a same type, for example, if both channels carry uplink control information, priorities of UCI carried by the channels are compared.

After the priority order rule is obtained and the priority order is determined, the obtaining a first available transmit power for the channels that are transmitted in the N first subframes and that are carried by the first carrier and a second available transmit power of the channel that is transmitted in the second subframe and that is carried by the second carrier, based on a priority order between the channels that are transmitted in the M first subframes and that are carried by the first carrier and the channel that is transmitted in the second subframe and that is carried by the second carrier includes:

reducing the first initial transmit power and the second initial transmit power based on the priority order, to respectively obtain the first available transmit power for the channels that are transmitted in the N first subframes and that are carried by the first carrier and the second available transmit power of the channel that is transmitted in the second subframe and that is carried by the second carrier, where a sum of the first available transmit power for the channels that are transmitted in the N first subframes and that are carried by the first carrier and the second available transmit power of the channel that is transmitted in the second subframe and that is carried by the second carrier is less than or equal to the maximum transmit power.

Specifically, an initial transmit power of a channel with a lower priority is reduced until the sum of the first available transmit power for the channels that are transmitted in the N first subframes and that are carried by the first carrier and the second available transmit power of the channel that is transmitted in the second subframe and that is carried by the second carrier is less than or equal to the maximum transmit power.

Alternatively, initial transmit powers of channels with different priorities are reduced according to different reduction ratios (a reduction ratio of a channel with a lower priority is greater than a reduction ratio of a channel with a higher priority) until the sum of the first available transmit power for the channels that are transmitted in the N first subframes and that are carried by the first carrier and the second available transmit power of the channel that is transmitted in the second subframe and that is carried by the second carrier is less than or equal to the maximum transmit power.

S1043: The terminal determines, based on the minimum guaranteed power and at least one of the first available transmit power and the second available transmit power, at least one of the available transmit power for the channels that are transmitted in the N first subframes and that are carried by the first carrier and the available transmit power of the channel that is transmitted in the second subframe and that is carried by the second carrier. In step S1043, the terminal may determine the available transmit power for the channels that are transmitted in the N first subframes and that are carried by the first carrier in the following manner: Maximum{P_priority, P_guaranteed}, where P_priority is the first available transmit power for the channels that are transmitted in the N first subframes and that is carried by the first carrier, and P_guaranteed is the minimum guaranteed power. In this case, an available transmit power of a channel that is transmitted in the second subframe and that is carried by the second carrier may be the second available transmit power.

In addition to the solution to taking a maximum value, the available transmit power for the channels that are transmitted in the N first subframe and that are carried by the first carrier may be determined by taking a minimum value or an average value. This is not limited herein.

It should be noted that the sum of the finally obtained available transmit power for the channels that are transmitted in the N first subframes and that are carried by the first carrier and the finally obtained available transmit power of the channel that is transmitted in the second subframe and that is carried by the second carrier is less than or equal to the maximum transmit power.

Further, the method may further include: transmitting, by the terminal based on the available transmit power for the channels that are transmitted in the N first subframes and that are carried by the first carrier, the channels that are transmitted in the N first subframes and that are carried by the first carrier, and transmitting, based on the available transmit power of the channel that is transmitted in the second subframe and that is carried by the second carrier, the channel that is transmitted in the second subframe and that is carried by the second carrier.

Alternatively, when only the available transmit power for the channels that are transmitted in the N first subframes and that are carried by the first carrier is determined in step S1043, the method may further include: transmitting, by the terminal based on the available transmit power for the channels that are transmitted in the N first subframes and that are carried by the first carrier, the channels that are transmitted in the N first subframes and that are carried by the first carrier, and transmitting, based on the second available transmit power of the channel that is transmitted in the second subframe and that is carried by the second carrier, the channel that is transmitted in the second subframe and that is carried by the second carrier.

Alternatively, when only the available transmit power of the channel that is transmitted in the second subframe and that is carried by the second carrier is determined in step S1043, the method may further include: transmitting, by the terminal based on the first available transmit power for the channels that are transmitted in the N first subframes and that are carried by the first carrier, the channels that are transmitted in the N first subframes and that are carried by the first carrier, and transmitting, based on the available transmit power of the channel that is transmitted in the second subframe and that is carried by the second carrier, the channel that is transmitted in the second subframe and that is carried by the second carrier.

In this application, an uplink subframe on one carrier or in one cell group overlaps a plurality of uplink subframes on another carrier or in another cell group, a minimum guaranteed power is reserved for a last part in an overlapping area, so that a power requirement in the last part of the overlapping area can be met during uplink power allocation to the two carriers, to ensure performance of data transmission in an uplink subframe of the last part in the overlapping area. This implements maximization of power efficiency of uplink data transmission and data transmission performance.

FIG. 7 shows a power adjustment method according to an embodiment of the present disclosure. The method is implemented by using the system shown in FIG. 1 or FIG. 2. The method includes the following steps.

S201: An access network device determines a power adjustment factor.

The power adjustment factor is used to determine an offset value between an available transmit power of a channel in a first part of a subframe and an available transmit power of a channel in a second part of the subframe. The power adjustment factor is specifically configured to: when a terminal sends data in an uplink subframe, adjust a transmit power of the data in the uplink subframe. Specifically, the terminal sends uplink data in the first part of the uplink subframe by using a first power, then obtains a second power through calculation based on the offset value and the first power, and sends uplink data in the second part of the uplink subframe by using the second power.

Specifically, the offset value may be a ratio value or a difference value. When the power adjustment factor is a difference value, controlling the offset value to be positive or negative to increase or reduce the first power, to obtain the second power. When the power adjustment factor is a ratio value, controlling the power value to be greater than or less than 1 to increase or reduce the first power, to obtain the second power.

During implementation, the power adjustment factor is a cell-specific parameter. To be specific, the power adjustment factor is set based on a cell, and therefore the power adjustment factor is the cell-specific parameter. During implementation, step S201 may include the following steps: The access network device determines a cell in which the terminal is located, and the access network device determines a corresponding power adjustment factor based on the cell in which the terminal is located.

S202: The access network device sends the power adjustment factor to a terminal.

During implementation, S202 may include: sending, by the access network device, the power adjustment factor to the terminal by using higher layer signaling or physical layer signaling.

The higher layer signaling may be RRC signaling, and the physical layer signaling may be DCI signaling.

Further, the physical layer signaling is physical layer signaling transmitted on a primary component carrier (for example, the second carrier), or the physical layer signaling is physical layer signaling transmitted on a secondary component carrier (for example, the first carrier). For example, the DCI signaling is DCI signaling transmitted on a primary component carrier, or the DCI signaling is DCI signaling transmitted on a secondary component carrier.

S203: The terminal receives the power adjustment factor sent by the access network device.

During implementation, S203 may include: receiving, by the terminal, the power adjustment factor that is sent by the access network device by using the higher layer signaling or the physical layer signaling.

S204: The terminal obtains a transmit power of the terminal on a channel in a second part of an uplink subframe based on the power adjustment factor and a transmit power of the terminal on a channel in a first part of the uplink subframe, where the uplink subframe includes the first part and the second part, and the second part follows the first part.

After determining the transmit powers of the two parts based on the power adjustment factor, the terminal sends the uplink subframe by using the two determined transmit powers. Two parts of an uplink subframe may be obtained through division by symbol or timeslot, and this is not limited herein.

In this application, during data transmission, the transmit powers of the channels in the two parts of the uplink subframe are adjusted by using the power adjustment factor, so that the transmit powers of the channels in the two parts of the uplink subframe can be adjusted in real time, and power allocation and power efficiency of the channels in the two parts of the uplink subframe can be maximized.

The following is apparatus embodiments of the present disclosure. For details not specifically described in the apparatus embodiments, refer to the foregoing corresponding method embodiments.

Figure 8:
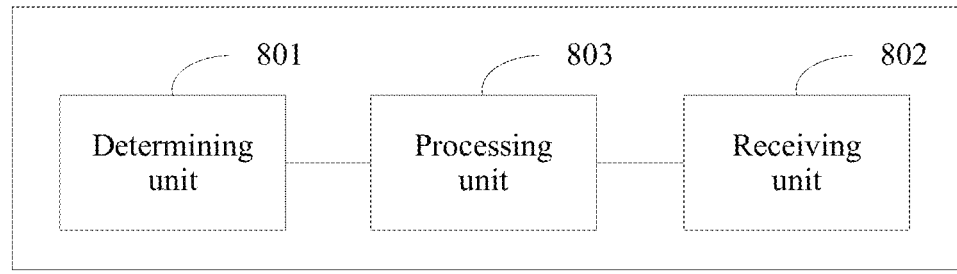
FIG. 8 is a schematic structural diagram of a communications apparatus according to an embodiment of the present disclosure.

FIG. 8 is a block diagram of a communications apparatus according to an embodiment of this application. The communications apparatus may be implemented as all or a part of a terminal by using a dedicated hardware circuit or a combination of software and hardware. The communications apparatus includes a determining unit 801, a receiving unit 802, and a processing unit 803. The determining unit 801 is configured to determine a first initial transmit power and a second initial transmit power. The first initial transmit power includes an initial transmit power of a channel that is transmitted in each of M first subframes and that is carried by a first carrier. The second initial transmit power is an initial transmit power of a channel that is transmitted in a second subframe and that is carried by a second carrier. The receiving unit 802 is configured to receive minimum guaranteed power information that is of channels carried by the first carrier and that is sent by an access network device. The processing unit 803 is configured to: when a sum of any of the first initial transmit powers and the second initial transmit power is greater than a maximum transmit power of the terminal, obtain an available transmit power for channels that are transmitted in N first subframes and that are carried by the first carrier and an available transmit power of the channel that is transmitted in the second subframe and that is carried by the second carrier, based on a priority order between the channels that are transmitted in the M first subframes and that are carried by the first carrier and the channel that is transmitted in the second subframe and that is carried by the second carrier and based on the minimum guaranteed power information of the channels carried by the first carrier. The second subframe on the second carrier overlaps the N first subframes on the first carrier, the M first subframes are first M first subframes of the N first subframes, N is greater than M, and M and N are positive integers.

The processing unit 803 is configured to:

obtain a minimum guaranteed power based on the minimum guaranteed power information of the channels carried by the first carrier;

obtain a first available transmit power for the channels that are transmitted in the N first subframes and that are carried by the first carrier and a second available transmit power of the channel that is transmitted in the second subframe and that is carried by the second carrier, based on the priority order between the channels that are transmitted in the M first subframes and that are carried by the first carrier and the channel that is transmitted in the second subframe and that is carried by the second carrier; and determine, based on the minimum guaranteed power and at least one of the first available transmit power and the second available transmit power, at least one of the available transmit power for the channels that are transmitted in the N first subframes and that are carried by the first carrier and the available transmit power of the channel that is transmitted in the second subframe and that is carried by the second carrier.

Optionally, the processing unit 803 is configured to:

reduce the first initial transmit power and the second initial transmit power based on the priority order, to respectively obtain the first available transmit power for the channels that are transmitted in the N first subframes and that are carried by the first carrier and the second available transmit power of the channel that is transmitted in the second subframe and that is carried by the second carrier, where a sum of the first available transmit power for the channels that are transmitted in the N first subframes and that are carried by the first carrier and the second available transmit power of the channel that is transmitted in the second subframe and that is carried by the second carrier is less than or equal to the maximum transmit power.

In this embodiment of the present disclosure, the priority order between the channels that are transmitted in the M first subframes and that are carried by the first carrier and the channel that is transmitted in the second subframe and that is carried by the second carrier includes at least one of a priority order between channel types, a priority order between UCI carried by channels, and a priority order between carriers corresponding to channels.

The priority order between channel types includes at least one of the following:

when there is a physical random access channel PRACH, the PRACH has a highest priority;

when a physical uplink control channel PUCCH and a physical uplink shared channel PUSCH coexist, a priority of the PUCCH is higher than a priority of the PUSCH, or a priority of the PUCCH is higher than a priority of a PUSCH carrying no UCI and is the same as a priority of a PUSCH carrying UCI;

when a PUSCH carrying uplink control information UCI and a PUSCH carrying no UCI coexist, a priority of the PUSCH carrying UCI is higher than a priority of the PUSCH carrying no UCI; or when a PRACH, a PUCCH, a PUSCH, and an SRS coexist, the SRS has a lowest priority.

Optionally, the receiving unit 802 is further configured to:

receive higher layer signaling or physical layer signaling that is sent by the access network device on the first carrier or the second carrier, where the higher layer signaling or the physical layer signaling includes a priority order rule, and the priority order rule is used to determine the priority order between the channels that are transmitted in the M first subframes and that are carried by the first carrier and the channel that is transmitted in the second subframe and that is carried by the second carrier.

Optionally, the receiving unit 802 is configured to:

receive first signaling that is sent by the access network device on the first carrier or the second carrier, where the first signaling is higher layer signaling or physical layer signaling that carries the minimum guaranteed power information of the channels carried by the first carrier.

A transmission subframe of the first signaling that is sent on the first carrier overlaps a transmission subframe of the second signaling that is sent on the second carrier, and the second signaling carries power allocation information of the channel that is carried by the second carrier in the second subframe.

For related details, refer to the method embodiment described in FIG. 6.

It should be noted that the receiving unit 802 may be implemented by a receiver or a processor coordinating with a receiver. The determining unit 801 and the processing unit 803 each may be implemented by a processor or by a processor executing a program instruction in a memory.

Figure 9:
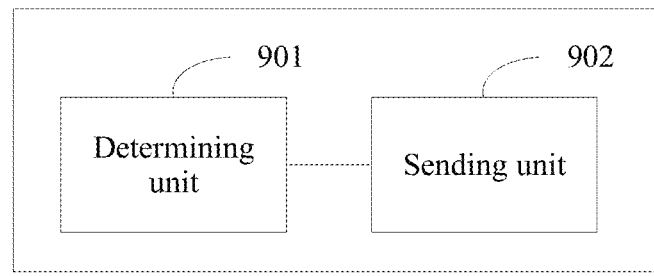
FIG. 9 is a schematic structural diagram of another communications apparatus according to an embodiment of the present disclosure.

FIG. 9 is a block diagram of a communications apparatus according to another embodiment of this application. The communications apparatus may be implemented as all or a part of an access network device by using a dedicated hardware circuit or a combination of software and hardware. The communications apparatus includes a determining unit 901 and a sending unit 902. The determining unit 901 is configured to determine minimum guaranteed power information of channels carried by a first carrier. The sending unit 902 is configured to send, to a terminal, the minimum guaranteed power information of the channels carried by the first carrier.

Specifically, the sending unit 902 is configured to:

send higher layer signaling or physical layer signaling to the terminal on the first carrier or the second carrier, where the higher layer signaling or the physical layer signaling includes the minimum guaranteed power information of the channels carried by the first carrier.

A transmission subframe of the first signaling that is sent on the first carrier overlaps a transmission subframe of the second signaling that is sent on the second carrier, and the second signaling carries power allocation information of the channel that is carried by the second carrier in the second subframe.

Optionally, the sending unit 902 is further configured to:

send the higher layer signaling or the physical layer signaling to the terminal on the first carrier or the second carrier, where the higher layer signaling or the physical layer signaling includes a priority order rule, and the priority order rule is used to determine the priority order between the channels that are transmitted in the M first subframes and that are carried by the first carrier and the channel that is transmitted in the second subframe and that is carried by the second carrier.

In this embodiment of the present disclosure, the priority order between the channels that are transmitted in the M first subframes and that are carried by the first carrier and the channel that is transmitted in the second subframe and that is carried by the second carrier includes at least one of a priority order between channel types, a priority order between UCI carried by channels, and a priority order between carriers corresponding to channels.

The priority order between channel types includes at least one of the following:

when there is a physical random access channel PRACH, the PRACH has a highest priority;

when a physical uplink control channel PUCCH and a physical uplink shared channel PUSCH coexist, a priority of the PUCCH is higher than a priority of the PUSCH, or a priority of the PUCCH is higher than a priority of a PUSCH carrying no UCI and is the same as a priority of a PUSCH carrying UCI;

when a PUSCH carrying uplink control information UCI and a PUSCH carrying no UCI coexist, a priority of the PUSCH carrying UCI is higher than a priority of the PUSCH carrying no UCI; or when a PRACH, a PUCCH, a PUSCH, and an SRS coexist, the SRS has a lowest priority.

For related details, refer to the method embodiment described in FIG. 6.

It should be noted that the determining unit 901 may be implemented by a processor or by a processor executing a program instruction in a memory. The sending unit 902 may be implemented by a transmitter or by a processor coordinating with a transmitter.

Figure 10:
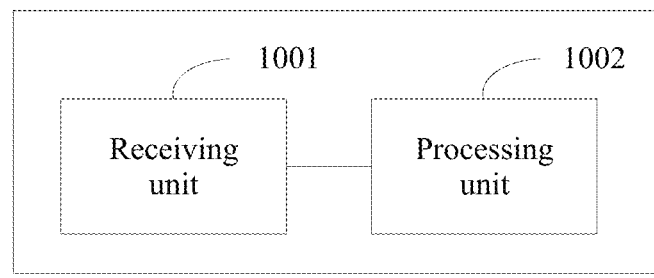
FIG. 10 is a schematic structural diagram of another communications apparatus according to an embodiment of the present disclosure.

FIG. 10 is a block diagram of a communications apparatus according to an embodiment of this application. The communications apparatus may be implemented as all or a part of a terminal by using a dedicated hardware circuit or a combination of software and hardware. The communications apparatus includes a receiving unit 1001 and a processing unit 1002. The receiving unit 1001 is configured to receive a power adjustment factor sent by an access network device. The processing unit 1002 is configured to obtain an available transmit power of a channel in a second part of a subframe based on the power adjustment factor and an available transmit power of a channel in a first part of the subframe. The subframe includes the first part and the second part, and the second part follows the first part. The power adjustment factor is used to determine an offset value between the available transmit power of the channel in the first part of the subframe and the available transmit power of the channel in the second part of the subframe.

In an implementation, the receiving unit 1001 is configured to:

receive the power adjustment factor that is sent by the access network device by using higher layer signaling or physical layer signaling.

The power adjustment factor is a cell-specific parameter.

For related details, refer to the method embodiment described in FIG. 7.

It should be noted that the receiving unit 1001 may be implemented by a receiver or a processor coordinating with a receiver. The processing unit 1002 may be implemented by a processor or by a processor executing a program instruction in a memory.

Figure 11:
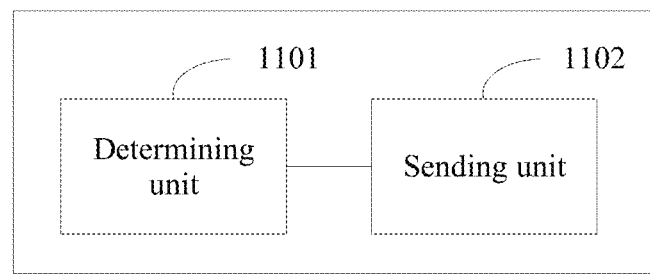
FIG. 11 is a schematic structural diagram of another communications apparatus according to an embodiment of the present disclosure.

FIG. 11 is a block diagram of a communications apparatus according to an embodiment of this application. The communications apparatus may be implemented as all or a part of an access network device by using a dedicated hardware circuit or a combination of software and hardware. The communications apparatus includes a determining unit 1101 and a sending unit 1102. The determining unit 1101 is configured to determine a power adjustment factor. The sending unit 1102 is configured to send the power adjustment factor to a terminal, where the power adjustment factor is used by the terminal to obtain an available transmit power of a channel in a second part of a subframe based on the power adjustment factor and an available transmit power of a channel in a first part of the subframe. The subframe includes the first part and the second part, and the second part follows the first part. The power adjustment factor is used to determine an offset value between the available transmit power of the channel in the first part of the subframe and the available transmit power of the channel in the second part of the subframe.

In an implementation, the sending unit 1102 is configured to:

send the power adjustment factor to the terminal by using higher layer signaling or physical layer signaling.

The power adjustment factor is a cell-specific parameter.

For related details, refer to the method embodiment described in FIG. 7.

It should be noted that the determining unit 1101 may be implemented by a processor or by a processor executing a program instruction in a memory. The sending unit 1102 may be implemented by a transmitter or by a processor coordinating with a transmitter.

Figure 12:
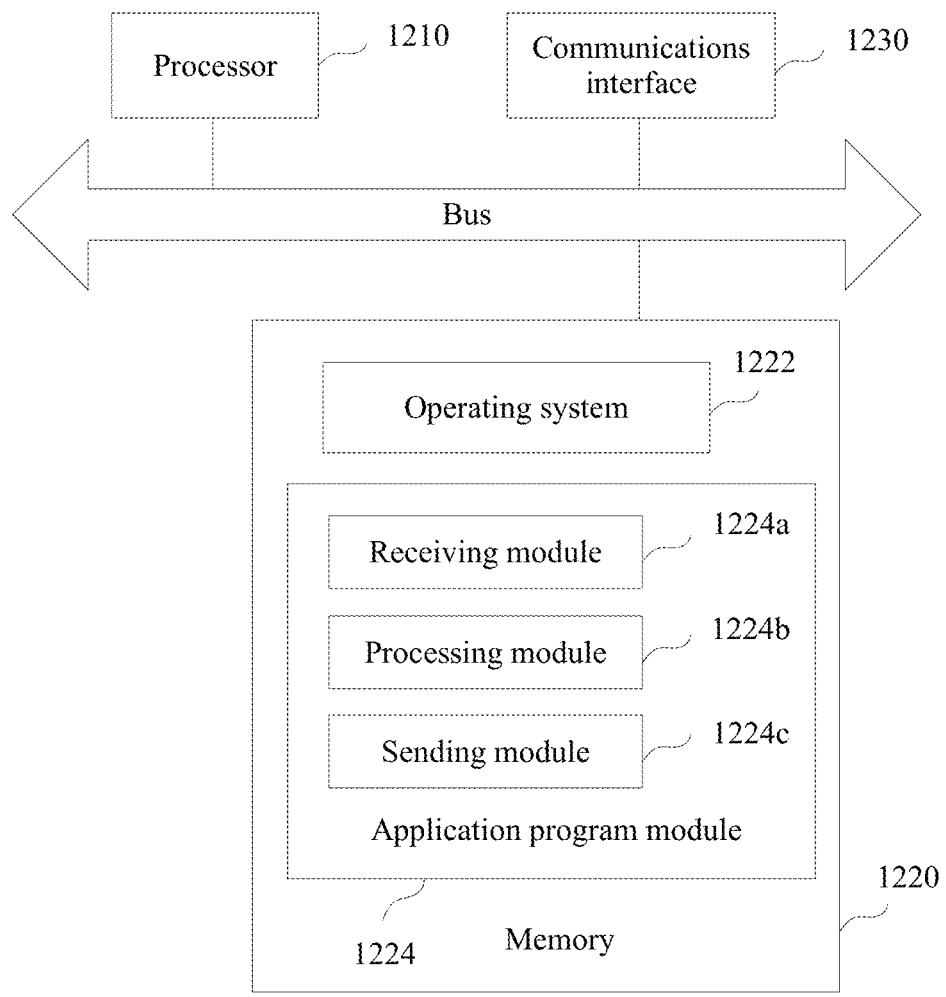
FIG. 12 is a schematic structural diagram of a communications chip according to an embodiment of the present disclosure.

FIG. 12 is a structural diagram of a communications chip according to an embodiment of this application. The communications chip is applied to a mobile communications system device such as the foregoing access network device or terminal. The communications chip includes a processor 1210, a memory 1220, and a communications interface 1230. The processor 1210 is connected to both the memory 1220 and the communications interface 1230 by using a bus.

The communications interface 1230 is configured to implement communication with another communications device.

The processor 1210 includes one or more processing cores. The processor 1210 runs an operating system or an application program module.

Optionally, the memory 1220 may store an operating system 1222 and an application program module 1224 required by at least one function. Optionally, the application program module 1224 includes a receiving module 1224a, a processing module 1224b, and a sending module 1224c. The receiving module 1224a is configured to implement a receiving-related step. The processing module 1224b is configured to implement a calculation-related or processing-related step. The sending module 1224c is configured to implement a sending-related step.

In addition, the memory 1220 may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

A person skilled in the art may understand that a structure shown in FIG. 12 does not constitute any limitation on the communications chip, and the communications chip may include components more or fewer than those shown in the figure, a combination of some components, or components disposed differently.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, or an optical disc.

The foregoing descriptions are merely optional embodiments of this application, but are not intended to limit this application. Any modification, equivalent replacement, or improvement made without departing from the spirit and principle of this application shall fall within the protection scope of this application.

What is claimed is:

1. A power allocation method, comprising:
   determining, by a terminal, a first initial transmit power and a second initial transmit power, wherein the first initial transmit power comprises an initial transmit power of a channel transmitted in each of M first subframes and carried by a first carrier, and the second initial transmit power is an initial transmit power of a channel transmitted in a second subframe and carried by a second carrier;
   receiving, by the terminal, minimum guaranteed power information of channels carried by the first carrier and that is sent by an access network device; and
   obtaining, by the terminal, in response to a sum of any of the first initial transmit powers and the second initial transmit power exceeding a maximum transmit power of the terminal, an available transmit power for channels that are transmitted in N first subframes and that are carried by the first carrier and an available transmit power of the channel that is transmitted in the second subframe and that is carried by the second carrier, based on a priority order between the channels that are transmitted in the M first subframes and that are carried by the first carrier and the channel that is transmitted in the second subframe and that is carried by the second carrier and based on the minimum guaranteed power information of the channels carried by the first carrier, wherein the second subframe on the second carrier overlaps the N first subframes on the first carrier, the M first subframes are first M first subframes of the N first subframes, N is greater than M, M and N are positive integers, N is greater than 1, M is greater than or equal to 1, and the second subframe is longer than each of the N first subframes.

2. The method according to claim 1, wherein obtaining, by the terminal, an available transmit power for channels that are transmitted in N first subframes and that are carried by the first carrier and an available transmit power of the channel that is transmitted in the second subframe and that is carried by the second carrier, based on a priority order between the channels that are transmitted in the M first subframes and that are carried by the first carrier and the channel that is transmitted in the second subframe and that is carried by the second carrier and based on the minimum guaranteed power information of the channels carried by the first carrier comprises:
   obtaining, by the terminal, a minimum guaranteed power based on the minimum guaranteed power information of the channels carried by the first carrier;
   obtaining, by the terminal, a first available transmit power for the channels that are transmitted in the N first subframes and that are carried by the first carrier and a second available transmit power of the channel that is transmitted in the second subframe and that is carried by the second carrier, based on the priority order between the channels that are transmitted in the M first subframes and that are carried by the first carrier and the channel that is transmitted in the second subframe and that is carried by the second carrier; and
   determining, by the terminal based on the minimum guaranteed power and at least one of the first available transmit power or the second available transmit power, at least one of the available transmit power for the channels that are transmitted in the N first subframes and that are carried by the first carrier and the available transmit power of the channel that is transmitted in the second subframe and that is carried by the second carrier.

3. The method according to claim 2, wherein obtaining, by the terminal, a first available transmit power for the channels that are transmitted in the N first subframes and that are carried by the first carrier and a second available transmit power of the channel that is transmitted in the second subframe and that is carried by the second carrier, based on the priority order between the channels that are transmitted in the M first subframes and that are carried by the first carrier and the channel that is transmitted in the second subframe and that is carried by the second carrier comprises:
   reducing the first initial transmit power and the second initial transmit power based on the priority order, to respectively obtain the first available transmit power for the channels that are transmitted in the N first subframes and that are carried by the first carrier and the second available transmit power of the channel that is transmitted in the second subframe and that is carried by the second carrier, wherein a sum of the first available transmit power of the channel that is transmitted in each of the N first subframes and that is carried by the first carrier and the second available transmit power of the channel that is transmitted in the second subframe and that is carried by the second carrier is less than or equal to the maximum transmit power.

4. The method according to claim 1, wherein the priority order between the channels that are transmitted in the M first subframes and that are carried by the first carrier and the channel that is transmitted in the second subframe and that is carried by the second carrier comprises at least one of a priority order between channel types, a priority order between uplink control information (UCI) carried by channels, or a priority order between carriers corresponding to channels.

5. The method according to claim 4, wherein the priority order between channel types comprises at least one of the following:
   when there is a physical random access channel (PRACH), the PRACH has a highest priority;
   when a physical uplink control channel (PUCCH) and a physical uplink shared channel (PUSCH) coexist, a priority of the PUCCH is higher than a priority of the PUSCH, or a priority of the PUCCH is higher than a priority of a PUSCH carrying no UCI and is the same as a priority of a PUSCH carrying UCI;
   when a PUSCH carrying uplink control information UCI and a PUSCH carrying no UCI coexist, a priority of the PUSCH carrying UCI is higher than a priority of the PUSCH carrying no UCI; or
   when a PRACH, a PUCCH, a PUSCH, and a sounding reference signal (SRS) coexist, the SRS has a lowest priority.

6. A power allocation method, comprising:
   determining, by an access network device, minimum guaranteed power information of channels carried by a first carrier; and
   sending, by the access network device, in response to a sum of any of a first initial transmit powers and a second initial transmit power exceeding a maximum transmit power of a terminal, the minimum guaranteed power information of the channels carried by the first carrier to the terminal for obtaining, an available transmit power for channels that are transmitted in N first subframes and that are carried by the first carrier and an available transmit power of a channel that is transmitted in a second subframe and that is carried by a second carrier, based on a priority order between channels that are transmitted in M first subframes and that are carried by the first carrier and the channel that is transmitted in the second subframe and that is carried by the second carrier and based on the minimum guaranteed power information of the channels carried by the first carrier, the first initial transmit power comprises an initial transmit power of the channel that is transmitted in each of the M first subframes and that is carried by the first carrier, the second initial transmit power is an initial transmit power of the channel that is transmitted in the second subframe and that is carried by the second carrier, the second subframe on the second carrier overlaps the N first subframes on the first carrier, the M first subframes are first M first subframes of the N first subframes, N is greater than M, M and N are positive integers, N is greater than 1, M is greater than or equal to 1, and the second subframe is longer than each of the N first subframes.

7. The method according to claim 6, wherein sending, by the access network device, the minimum guaranteed power information of the channels carried by the first carrier comprises:
sending, by the access network device, higher layer signaling or physical layer signaling to the terminal on the first carrier or the second carrier, wherein the higher layer signaling or the physical layer signaling comprises the minimum guaranteed power information of the channels carried by the first carrier.

8. The method according to claim 7, wherein a transmission subframe of the first signaling that is sent on the first carrier overlaps a transmission subframe of the second signaling that is sent on the second carrier, and the second signaling carries power allocation information of the channel that is carried by the second carrier in the second subframe.

9. The method according to claim 6, further comprising:
sending, by the access network device, higher layer signaling or physical layer signaling to the terminal on the first carrier or the second carrier, wherein the higher layer signaling or the physical layer signaling comprises a priority order rule for determining the priority order between the channels that are transmitted in the M first subframes and that are carried by the first carrier and the channel that is transmitted in the second subframe and that is carried by the second carrier.

10. The method according to claim 9, wherein the priority order between the channels that are transmitted in the M first subframes and that are carried by the first carrier and the channel that is transmitted in the second subframe and that is carried by the second carrier comprises at least one of a priority order between channel types, a priority order between uplink control information (UCI) carried by channels, or a priority order between carriers corresponding to channels.

11. The method according to claim 10, wherein the priority order between channel types comprises at least one of the following:
when there is a physical random access channel (PRACH), the PRACH has a highest priority;
when a physical uplink control channel (PUCCH) and a physical uplink shared channel (PUSCH) coexist, a priority of the PUCCH is higher than a priority of the PUSCH, or a priority of the PUCCH is higher than a priority of a PUSCH carrying no UCI and is the same as a priority of a PUSCH carrying UCI;
when a PUSCH carrying UCI and a PUSCH carrying no UCI coexist, a priority of the PUSCH carrying UCI is higher than a priority of the PUSCH carrying no UCI; or
when a PRACH, a PUCCH, a PUSCH, and a sounding reference signal (SRS) coexist, the SRS has a lowest priority.

12. A terminal, comprising:
a processor;
a receiver; and
a non-transitory computer-readable storage medium storing a program to be executed by the processor, the program including instructions that cause the terminal to:
determine a first initial transmit power and a second initial transmit power, wherein the first initial transmit power comprises an initial transmit power of a channel transmitted in each of M first subframes and carried by a first carrier, and the second initial transmit power is an initial transmit power of a channel transmitted in a second subframe and carried by a second carrier;
receive, via the receiver, minimum guaranteed power information of channels carried by the first carrier and that is sent by an access network device; and
obtain, in response to a sum of any of the first initial transmit powers and the second initial transmit power exceeding a maximum transmit power of the terminal, an available transmit power for channels that are transmitted in N first subframes and that are carried by the first carrier and an available transmit power of the channel that is transmitted in the second subframe and that is carried by the second carrier, based on a priority order between the channels that are transmitted in the M first subframes and that are carried by the first carrier and the channel that is transmitted in the second subframe and that is carried by the second carrier and based on the minimum guaranteed power information of the channels carried by the first carrier, wherein the second subframe on the second carrier overlaps the N first subframes on the first carrier, the M first subframes are first M first subframes of the N first subframes, N is greater than M, M and N are positive integers, N is greater than 1, M is greater than or equal to 1, and the second subframe is longer than each of the N first subframes.

13. The terminal according to claim 12 wherein the processor is configured to:
obtain a minimum guaranteed power based on the minimum guaranteed power information of the channels carried by the first carrier;
obtain a first available transmit power for the channels that are transmitted in the N first subframes and that are carried by the first carrier and a second available transmit power of the channel that is transmitted in the second subframe and that is carried by the second carrier, based on the priority order between the channels that are transmitted in the M first subframes and that are carried by the first carrier and the channel that is transmitted in the second subframe and that is carried by the second carrier; and determine, based on the minimum guaranteed power and at least one of the first available transmit power or the second available transmit power, at least one of the available transmit power for the channels that are transmitted in the N first subframes and that are carried by the first carrier and the available transmit power of the channel that is transmitted in the second subframe and that is carried by the second carrier.

14. The terminal according to claim 13 wherein the processor is configured to:
reduce the first initial transmit power and the second initial transmit power based on the priority order, to respectively obtain the first available transmit power for the channels that are transmitted in the N first subframes and that are carried by the first carrier and the second available transmit power of the channel that is transmitted in the second subframe and that is carried by the second carrier, wherein a sum of the first available transmit power for the channels that are transmitted in the N first subframes and that are carried by the first carrier and the second available transmit power of the channel that is transmitted in the second subframe and that is carried by the second carrier is less than or equal to the maximum transmit power.

15. The terminal according to claim 12, wherein the priority order between the channels that are transmitted in the M first subframes and that are carried by the first carrier and the channel that is transmitted in the second subframe and that is carried by the second carrier comprises at least one of a priority order between channel types, a priority order between uplink control information (UCI) carried by channels, or a priority order between carriers corresponding to channels.

16. The terminal according to claim 15, wherein the priority order between channel types comprises at least one of the following:
when there is a physical random access channel (PRACH), the PRACH has a highest priority;
when a physical uplink control channel (PUCCH) and a physical uplink shared channel (PUSCH) coexist, a priority of the PUCCH is higher than a priority of the PUSCH, or a priority of the PUCCH is higher than a priority of a PUSCH carrying no UCI and is the same as a priority of a PUSCH carrying UCI;
when a PUSCH carrying UCI and a PUSCH carrying no UCI coexist, a priority of the PUSCH carrying UCI is higher than a priority of the PUSCH carrying no UCI; or
when a PRACH, a PUCCH, a PUSCH, and a sounding reference signal (SRS) coexist, the SRS has a lowest priority.

17. An access network device, comprising:
a processor;
a transmitter; and
a non-transitory computer-readable storage medium storing a program to be executed by the processor, the program including instructions that cause the network access device to:
determine minimum guaranteed power information of channels carried by a first carrier; and
send, via the transmitter, in response to a sum of any of a first initial transmit powers and a second initial transmit power exceeding a maximum transmit power of a terminal, the minimum guaranteed power information of the channels carried by the first carrier to a terminal for obtaining, an available transmit power for channels that are transmitted in N first subframes and that are carried by the first carrier and an available transmit power of a channel that is transmitted in a second subframe and that is carried by a second carrier, based on a priority order between channels that are transmitted in M first subframes and that are carried by the first carrier and the channel that is transmitted in the second subframe and that is carried by the second carrier and based on the minimum guaranteed power information of the channels carried by the first carrier, the first initial transmit power comprises an initial transmit power of the channel that is transmitted in each of the M first subframes and that is carried by the first carrier, the second initial transmit power is an initial transmit power of the channel that is transmitted in the second subframe and that is carried by the second carrier, the second subframe on the second carrier overlaps the N first subframes on the first carrier, the M first subframes are first M first subframes of the N first subframes, N is greater than M, M and N are positive integers, N is greater than 1, M is greater than or equal to 1, and the second subframe is longer than each of the N first subframes.

18. The access network device according to claim 17, wherein the transmitter is configured to:
send higher layer signaling or physical layer signaling to the terminal on the first carrier or the second carrier, wherein the higher layer signaling or the physical layer signaling comprises the minimum guaranteed power information of the channels carried by the first carrier.

19. The access network device according to claim 18, wherein a transmission subframe of the first signaling that is sent on the first carrier overlaps a transmission subframe of the second signaling that is sent on the second carrier, and the second signaling carries power allocation information of the channel that is carried by the second carrier in the second subframe.

20. The access network device according to claim 17, wherein the transmitter is further configured to:
send higher layer signaling or physical layer signaling to the terminal on the first carrier or the second carrier, wherein the higher layer signaling or the physical layer signaling comprises a priority order rule for determining the priority order between the channels that are transmitted in the M first subframes and that are carried by the first carrier and the channel that is transmitted in the second subframe and that is carried by the second carrier.

21. The access network device according to claim 20, wherein the priority order between the channels that are transmitted in the M first subframes and that are carried by the first carrier and the channel that is transmitted in the second subframe and that is carried by the second carrier comprises at least one of a priority order between channel types, a priority order between uplink control information (UCI) carried by channels, or a priority order between carriers corresponding to channels.

22. The access network device according to claim 21, wherein the priority order between channel types comprises at least one of the following:
when there is a physical random access channel (PRACH), the PRACH has a highest priority;
when a physical uplink control channel (PUCCH) and a physical uplink shared channel (PUSCH) coexist, a priority of the PUCCH is higher than a priority of the PUSCH, or a priority of the PUCCH is higher than a priority of a PUSCH carrying no UCI and is the same as a priority of a PUSCH carrying UCI;

when a PUSCH carrying UCI and a PUSCH carrying no UCI coexist, a priority of the PUSCH carrying UCI is higher than a priority of the PUSCH carrying no UCI; or when a PRACH, a PUCCH, a PUSCH, and a sounding reference signal (SRS) coexist, the SRS has a lowest priority.

* * * * *